(12) United States Patent
Lorenz et al.

(10) Patent No.: US 6,706,518 B2
(45) Date of Patent: Mar. 16, 2004

(54) CLEARING WASTE WATER PIPES OR GREASE TRAPS CLOGGED WITH GREASE WITH A GREASE SOLVENT

(75) Inventors: Hans-Eberhard Lorenz, Kevelar (DE); Albrecht Lang, Issum (DE); Manuel Lüling, Issum (DE); Heiner Ophardt, Issum (DE)

(73) Assignee: Ophardt Product GmbH & Co. KG, Issum (DE)

( * ) Notice: Subject to any disclaimer, the term of this patent is extended or adjusted under 35 U.S.C. 154(b) by 163 days.

(21) Appl. No.: 09/793,823

(22) Filed: Feb. 23, 2001

(65) Prior Publication Data

US 2002/0023875 A1 Feb. 28, 2002

Related U.S. Application Data

(63) Continuation-in-part of application No. PCT/EP99/06126, filed on Aug. 20, 1999.

(30) Foreign Application Priority Data

Aug. 24, 1998 (DE) .......................................... 198 38 202
Dec. 17, 1998 (DE) .......................................... 198 58 189

(51) Int. Cl.[7] .............................. C12S 9/00; C12M 1/36
(52) U.S. Cl. ................. 435/264; 435/286.5; 435/286.7; 435/289.1; 210/614
(58) Field of Search ................................ 435/262, 264, 435/286.5, 286.7, 260, 289.1; 210/610, 611, 614

(56) References Cited

U.S. PATENT DOCUMENTS

| | | |
|---|---|---|
| 3,932,943 A * | 1/1976 | Briggs et al. .................. 34/287 |
| 4,237,003 A | 12/1980 | El-Sayed |
| 4,670,149 A | 6/1987 | Francis |
| 4,810,385 A | 3/1989 | Hater et al. |
| 4,882,059 A | 11/1989 | Wong et al. |
| 4,888,171 A * | 12/1989 | Okonogi et al. ............ 424/93.4 |
| 4,925,564 A | 5/1990 | Francis |
| 5,171,687 A | 12/1992 | Moller et al. |
| 5,225,083 A | 7/1993 | Pappas et al. |
| 5,284,587 A | 2/1994 | Wong et al. |
| 5,630,883 A * | 5/1997 | Steer et al. ............... 134/22.13 |
| 5,683,575 A * | 11/1997 | Yates et al. .................. 210/138 |
| 6,245,552 B1 * | 6/2001 | Glendening et al. ........ 435/262 |

FOREIGN PATENT DOCUMENTS

| | | | |
|---|---|---|---|
| DE | 3906124 | 8/1990 | |
| EP | 0178931 | 4/1986 | |
| EP | 0185528 | 6/1986 | |
| EP | 0546881 | 6/1993 | |
| JP | 07284794 A * | 10/1995 | ............. C02F/3/12 |
| WO | 9707190 | 2/1997 | |
| WO | WO 200011130 A1 * | 3/2000 | ............. C02F/1/68 |

* cited by examiner

*Primary Examiner*—William H. Beisner
(74) *Attorney, Agent, or Firm*—Nils H. Ljungman & Associates

(57) ABSTRACT

There is disclosed a method and apparatus for clearing waste water pipes and/or grease traps clogged with grease, with the method comprising the steps of: providing a dry agent comprising bacteria and enzymes; mixing dry agent comprising bacteria and enzymes with an amount of water sufficient to cause in-situ production of an aqueous mixture; maintaining the aqueous mixture in an activator vessel structure to activate the aqueous mixture for a time sufficient to form an aqueous solvent for cleaning or clearing fatty residues and/or grease; contacting the waste water pipes and/or grease traps containing fatty residues and/or grease with the aqueous solvent to dissolve the grease and/or fatty residues; and thus cleaning the waste water pipes and/or grease traps by biodigesting fatty residues and/or grease deposited in the waste water pipes and/or grease traps.

19 Claims, 9 Drawing Sheets

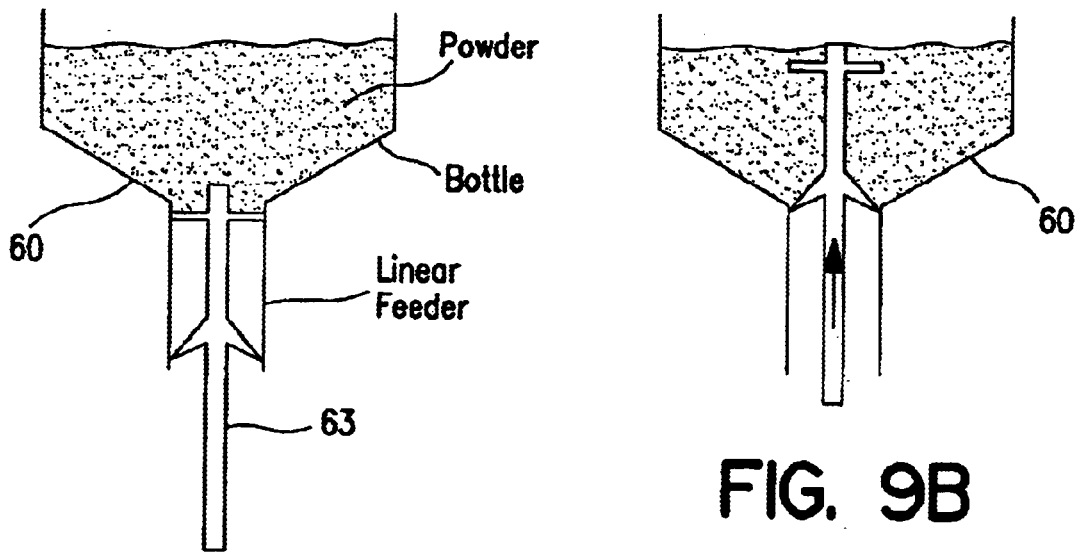
FIG. 9A
FIG. 9B
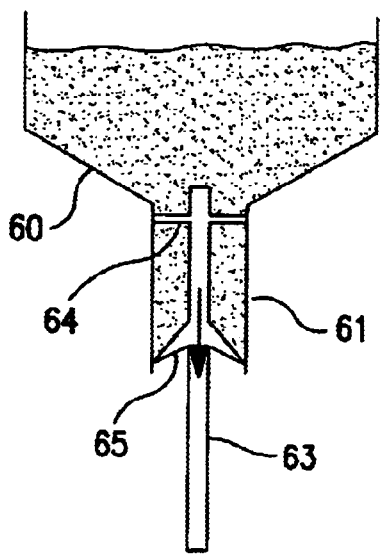
FIG. 9C
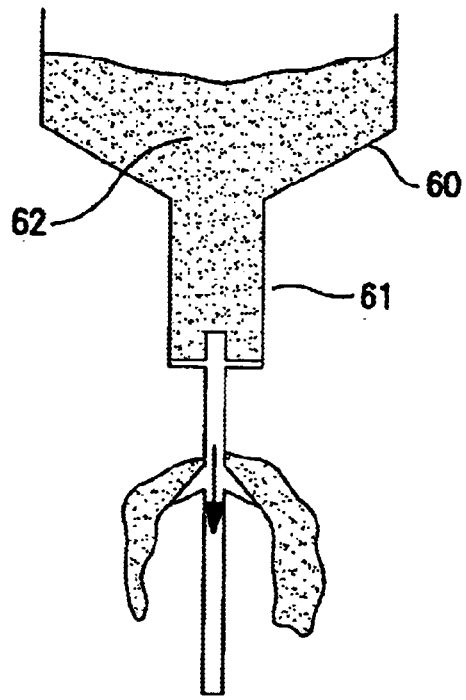
FIG. 9D

US 6,706,518 B2

CLEARING WASTE WATER PIPES OR GREASE TRAPS CLOGGED WITH GREASE WITH A GREASE SOLVENT

CONTINUING APPLICATION DATA

This application is a Continuation-in-Part application of International Application No. PCT/EP99/06126, filed on Aug. 20, 1999 and claiming priority from Federal Republic of Germany Patent Application No. DE 198 38 202.2, filed on Aug. 24, 1998 and Federal Republic of Germany Patent Application No. DE 198 58 189.0, filed on Dec. 17, 1998. International Application No. PCT/EP99/06126 was pending as of the filing date of the above-cited application. The United States was an elected state in International Application No. PCT/EP99/06126.

BACKGROUND OF THE INVENTION

1. Field of the Invention

The invention relates to the clearing of grease by means of a grease solvent, in particular with enzymes and bacteria as the grease solvent and for the clearing of drainage pipes and grease traps.

2. Background of the Invention

The incidence of grease in different businesses is quite considerable. This applies, for example, in slaughterhouses, sausage and meat product factories, restaurants, fish processing plants, industrial undertakings in which oils and fats are processed and barrel-washing plants. The incidence of grease is seen as a significant problem. As an example, reference is made to the description "In Situ Bioremediation of Food-Service Waste Grease" by Bobby F. Dowden.

According to DIN 4041 a grease trap is prescribed for these businesses so that any grease introduced does not get into the public sewer network/drainage system.

There are also corresponding regulations in other countries. The separated grease must be removed regularly. Even today, the grease in the grease trap is sometimes still removed by skimming off. Skimming off is a very unpalatable task. Added to this are hygiene problems in the grease trap, above all with animal and vegetable fats. Finally, the skimmed-off grease has to be disposed of.

Dowden's description already refers to the use of enzymes for the degradation of grease. There has been a biological alternative to manual cleaning for several years.

Grease-degrading bacteria and enzymes are measured out into the drainage pipe as a solution in an aqueous nutrient solution. These convert the grease into harmless solids, which can pass into the drainage system without any problems. This technique is described, for example, in U.S. Pat. No. 5,225,083 and likewise in U.S. Pat. No. 4,925,564, U.S. Pat. No. 4,237,003, U.S. Pat. No. 4,810,385, U.S. Pat. No. 4,670,149, U.S. Pat. No. 4,882,059, U.S. Pat. No. 5,171,687, German Patent No. 3906124, European Patent No. 0178931A1, European Patent No. 185528A2.

Enzymes and bacteria occur naturally. They are to be found on an appropriate culture medium. Perishable goods can be used in the search for and isolation of suitable enzyme and bacterial strains. Amongst these are meat and sausage. A greater or lesser number of enzymes and bacteria can be found on the surviving meat and sausage samples. These bacteria can be isolated and propagated in incubators until a technically useable quantity of enzymes and bacteria have been produced.

Starch, amongst other things, is suitable as a nutrient for the enzymes and bacteria. The propagation of the enzymes and bacteria is very successful in the presence of damp and moderate warmth.

The use of enzymes and bacteria in an aqueous nutrient solution is an advantage. However, the technique has not been widely implemented. This is due to the fact that the technique used up till now leaves much to be desired in practice.

The greatest deficiency is the relatively low efficiency in comparison with traditional chemical pipe cleaning agents and grease solvents.

An enzymatic cleaning agent for drains in the home and in commerce is known from Federal Republic of Germany Patent Publication DE-A-3906124. Here, use is made of enzyme mixtures made from pectinases, amylases, cellulases, polygalactoses, lipases and proteases. When common cleaning agents are prepared in liquid form, provision is made to preserve the enzymes until they are used, preferably with salts of sorbic acid and benzoic acid. When the enzymes come to be used, the preservative must be removed once more. This is achieved using enzyme-tolerant tensides. The cleaning agent was developed in 1989 and has not been generally accepted up to the present day.

The same is true of the cleaning agent known from the International Patent Publication WO 97/07190. Here too, the use of enzymes for the cleaning of milk residues is proposed. Before being used for cleaning, the enzymes are dissolved in water for some time and also heated.

Notwithstanding this, the invention seeks to retain the enzyme technique as this technique promises ecological advantages.

In this regard, the invention turns to an older idea. According to this, a solution/suspension containing enzymes is fed at intervals into the drainage pipe or into a grease trap. This idea is based on a preventative degradation of the grease before the build-up of grease leads to a problem in operation. However, this technique has not yet been adopted in practice.

OBJECT OF THE INVENTION

The object of the invention is thus to develop the enzyme technique further. In doing so, the invention starts from the consideration of reducing the transportation and storage volumes.

SUMMARY OF THE INVENTION

According to the invention, this object is accomplished by a process for the clearing or cleaning of grease and/or fat by means of a grease solvent with enzymes and bacteria in an aqueous form as the grease solvent and for the clearing of drainage pipes and/or grease traps, characterised in that the grease solvent is produced in situ by combining dry concentrate and water, the water and the dry concentrate first being put into an activator container and activated there, and subsequently introduced into the drainage pipe and/or the grease trap.

The grease solvent made from enzymes and bacteria is supplied and stored in a dry state and is prepared in situ by combining with water, the water and the dry concentrate first being fed into an activator container where they are activated and subsequently fed into the drainage pipe and/or the grease trap. In this case, in situ means in the grease trap or optionally before the grease trap in the direction of flow, if possible immediately at the point where the grease enters.

Advantageously, the introduction of grease solvents can also be used to prevent a damaging build-up of grease in the drainage system without a grease trap so that the installation of a grease trap can be omitted, where this is permissible. The introduction of grease solvents then takes place preferably as close as possible to the point at which the grease enters the drainage system, at the latest at the point where a significant deposition of grease from the waste water is to be expected, this being the grease trap when fitted or the point at which a grease trap would most sensibly be positioned.

The amount of dry concentrate in relation to a liter of water is between 4 and 100 grams, for example. At the same time, the possible mixing in of a filler material is of considerable importance. The filler material can be sawdust.

The dry concentrate is preferably obtained by freeze-drying and not by heating the nutrient liquid in which the enzymes and bacteria are bred, because the enzymes and bacteria can only be subjected to low levels of heat. Advantageously, the nutrient used for breeding the enzymes or bacteria remains in the concentrate when drying so that it is only necessary to add water/moisture to again activate the enzymes and bacteria.

The process according to the invention is based on the knowledge that the grease solvent in the aqueous solution only makes up a small percentage of it. By reducing the transportation and storage to a dry concentrate, the costs for packing and delivery are dramatically reduced. While conventional liquids are delivered by lorry or carrier on account of their volume and weight, the dry concentrate according to the invention can be transported by post with a very great absolute cost advantage due to its low weight in spite of higher specific transport costs. The result is that the process according to the invention exhibits great advantages.

With less of an economic advantage, it is also possible to supply a liquid concentrate and to dilute it in-situ with water. However, this technology (fluid technology) is not comparable with the use of dry concentrate (dry technology) because, with fluid technology, comprehensive cooling of the concentrate must take place during storage and transportation. Otherwise an unwanted activation of the enzymes and bacteria would occur. The further capability of the enzymes and bacteria to survive then depends upon an adequate supply of nutrients. By necessity, the supply of nutrients in the liquid concentrate is soon used up, so that the enzymes and bacteria soon become unusable if they are activated during storage and transportation.

The term dry concentrate does not exclude residual moisture according to the invention. The greater the degree of drying, the less is the danger of an unwanted activation of the enzymes and bacteria.

In a further embodiment of the invention, the combining of the dry concentrate and water takes place close to/immediately at the point where the grease solvent is introduced into the waste water, so that a suspension or a solution is formed. At the same time, the necessary preparation time is taken into account, if necessary by advancing the preparation with respect to the time of introduction. In particular, the preparation time includes the activation time for the enzymes and bacteria and also a time to dissolve/distribute the dry concentrate. The time taken to dissolve in water is shorter the finer the granules of dry concentrate are. As an option, the fineness can be increased by mechanical pulverisation. Grinding is a suitable form of pulverisation.

The preferred process for producing the concentrate from a nutrient liquid is freeze-drying. Different particle sizes occur if the shape formation is uncontrolled during freeze-drying. This can be helped by grinding, however.

Oversized particles can also be avoided by a controlled definition of the shape. This can take place during or after the freeze-drying by means of pelletisation. Pellets are produced between two rollers, for example. The surfaces of such rollers are profiled accordingly, i.e. provided with appropriate depressions. The concentrate is squeezed into these depressions. Particularly suitable shapes for pelletising with rollers are lentil shapes. The corresponding depressions in the surfaces of the rollers are dome-shaped.

An alternative pelletising process includes the squeezing of the starting material through nozzles. The resulting strand of material is granulated (pulverised).

In practice, material with pre-determined dimensions is obtained most of the time both when pelletising using rollers and when pelletising with nozzles followed by granulation. However, more or less fine granules are also obtained from the edges/burrs and broken pieces of pellet material. Preferably, the unwanted granules (undersized granules) are sieved off or separated in other ways from the wanted granules by screening.

Screening has even greater importance in the grinding process mentioned above. Here, not only undersized granules but preferably also oversized granules are screened out. The oversized granules are subjected to a further grinding process.

Preferred pellet sizes and corresponding coarse granules have a diameter of from 2 to 4 mm.

In all the pelletising processes, residual moisture in the dry concentrate is a great advantage in producing and maintaining the shape. If a greater degree of dryness is desired, the pellets are subjected to further drying.

The activation starts in water. A time of at least 0.5 hours is required for activation. As defined by the invention, activation means the multiplication of the enzymes and bacteria until the grease solvent exhibits the desired grease-degradation capacity.

The larger the proportion of concentrate in the water, the quicker a sufficiently effective grease solvent will be available. As a rule, activation times of more than 24 hours are not envisaged.

It is preferred that the concentrate is dissolved in water as this remains stable without any special measures being taken. When producing a suspension or solution a uniform distribution of the concentrate in the suspension or solution can be guaranteed in the well-known manner with the help of an agitator. Such measures can be dispensed with if the suspension or solution is produced a short period of time before the planned introduction of the grease solvent so that there is no fear of a disadvantageous separation/deposition of the concentrate. Slight separations/deposits will be carried away with the grease solvent when it is poured out. The time limits for separation can be determined by a small number of trials.

As an alternative or in addition, the liquid in the activator container used for making the suspension or solution can be agitated before the introduction of the grease solvent, thus swirling up the deposits that have formed.

The suspension or solution produced according to the invention can be introduced in the same manner as the usual liquid agents.

The suspension or solution produced in situ is preferably introduced intermittently. In doing so either specific time intervals are maintained or optionally the time intervals can be chosen to suit the incidence of grease. The incidence of grease can be measured with a flow-measuring device, for example. The measurement can be limited to measuring whether there is any flow at all. The measurement can also establish the order of magnitude of the flow. With the aid of a computer, the desired quantity of grease solvent can then be calculated relatively accurately and can be used to control the dosing. The dosing can include a volumetric and/or a weight-related proportioning of the dry concentrate and/or the grease solvent.

As long as the major part of the grease collects in the grease trap, it is an advantage to adjust the quantity of grease solvent so that only a small amount of grease solvent or even none at all immediately overflows flows the grease trap and flows unused into the system.

Wherever a grease trap with a sump in which drainage water can collect is not fitted, the quantity of grease solvent is preferably adjusted so that there is just sufficient and not excessive coating of the channel surfaces or drainage pipe surfaces that are contaminated with grease. Optionally, the dosing of the grease solvent can also take place solely on a time basis and independently of the magnitude of the flow.

The timing of the dosing can be chosen in a number of ways. In restaurants, for example, the introduction of grease solvent can take place after the midday meal and when the kitchen closes for the night. In doing so, a quantity of grease solvent can be introduced that is matched to the incidence of grease determined by experience or if necessary by trial and error. The quantity of grease solvent required can be determined by trials, for example, by changing the quantity/increasing the quantity/reducing the quantity and by comparing the incidence of grease in the grease trap in the trials with the earlier incidence of grease if necessary.

Particularly favourable cleaning results can be expected at times when business has ceased. At these times, the longest activity time is available for the grease solvent to do its work before the grease solvent is washed away by the next lot of waste water.

As described above, grease deposits can be effectively countered even without the use of measuring devices.

Furthermore, the more frequent instigation of dosing/introduction of grease solvent according to the invention is an advantage for the business. This counteracts deposits in the unit.

A time switch, for example, in the form of a clock whose switching intervals can be adjusted, is suitable for the simplified introduction of grease solvent according to the invention without the use of a measuring device. Such time switches should preferably have several switching intervals.

Different types of apparatus can be considered for the dosing of the dry concentrate devices with linear dosing movements and devices with circular dosing movements.

The dry concentrate is preferably measured out from a storage container by means of a dosing drum into the water intended for the solution or suspension. The dosing drum can have one or more recesses/pockets into which the dry concentrate flows under gravity from above and, after the drum turns, falls out again due to gravity. Each pocket can be sized in such a way that a single filling is sufficient for the production of the desired suspension or solution. The pockets in the drum can also be sized in such a way that the filling and emptying of several pockets or several filling and emptying processes are required in order to measure out the quantity of concentrate needed for a desired suspension or solution. With such a measuring device, it is possible to take the requirements for different quantities of concentrate into account without any problems.

When there is a single pocket in the dosing drum, a periodic rotation of the drum through 180 degrees is required to bring the drum from a vertical filling position into the emptying position vertically beneath it. In the vertical position the filling and emptying conditions are optimum. Usable filling conditions and emptying conditions are also still present with deviations of 30 degrees from the vertical.

It is an advantage if the dosing drum runs between the filling position and the emptying position in an enclosed housing jacket, which prevents unwanted emptying and/or if the dosing drum stops in a particular position. This can be the emptying position or the filling position, or a position in between. When there are several pockets on the circumference of the dosing drum, the rotation of the drum between two emptying processes is shorter.

As an alternative to the dosing drum, a cell wheel can also be used. In contrast to the dosing drum, the cell wheel has only thin walls between two pockets. The thin walls impose increasing demands on the control of the wheel and on the seals. In a normal cell wheel there are problems of accuracy and problems of moisture penetrating the concentrate storage container.

For this reason, the cell wheel according to the invention preferably only has limited application, namely when the pockets between two adjacent walls have a small volume so that a large number of pockets have to be filled and emptied to achieve a desired quantity of concentrate. With a low pocket volume, positioning errors/control errors in the cell wheel and the difficulties resulting from these with the seals of the cell wheel are alleviated because there is now only a dependence on how much concentrate has already accidentally poured out of the first pocket intended for a dosing process and how much more concentrate is added from the pocket following the last pocket to be emptied to give the desired quantity of concentrate.

In contrast to the cell wheel, with the dosing drum there are significantly larger areas of the circumference that can be used as sealing surfaces and which guarantee a good seal even with substantial control tolerances, because the sealing lips are always in contact with the surface of the circumference.

A stepper motor is of advantage for the drive to the dosing drum, the minimum switching step being less than or equal to the smallest rotation of the drum between two emptying processes or between two filling processes.

The rotation of the drum can be different depending upon the number of pockets on the circumference of the drum and the method of operation.

In the case of a single pocket, each switching step can be a 180-degree rotation. When the speed of rotation is low and several filling and emptying processes are required to deliver the desired quantity of concentrate, one switching step can include several revolutions without intermediate stops.

Advantageously, the invention opens up the possibility of using the same dosing drums or cell wheels for different applications and adapting the dosing by changing the number of filling and emptying cycles.

It is an advantage as regards the dosing drum if the motor is provided with a step control or if a pulse-controlled stepper motor is used. The control is preferably electronic and includes the measurement of speed and/or the angle of pivoting. A motor that can turn both clockwise and anticlockwise and/or a speed-controlled motor opens up further advantages.

With such a controllable drive the dosing drum can be returned to the filling position after every emptying process or brought to a position between the filling opening and the emptying opening, or to particular emptying positions or filling positions in which the pocket sits at an angle forming an incoming or outgoing slope. Furthermore, the tipping process can be affected by changing the speed of tipping. This can be used to reduce water splashes.

The drum housing optionally has a continuous shaft running through it. The dosing drum then sits as a rotating sealing mechanism in the shaft.

A small motor is recommended for the drive to the dosing drum, the movement of which is reduced by a gear.

As an option, the gearing can also be designed as a controller for the dosing drum by using a rotating toothed ring, which is moved by a pinion on the drive shaft of the motor. At the same time the toothed ring can act as a cam controller if it is of sufficient size for fitting cams.

Additional seals are preferably provided for the dosing drum, which are intended to prevent the ingress of moisture into the storage container. The seals can be made up of customary O-rings and straight sealing strips. Seals made in one piece can also be used, however.

The seals on the outlet opening of the shaft have the greatest efficiency. Here, the seals are provided in the gap between the drum and the housing.

When pellets or coarse-grained dry concentrate are used, rubber seals with their resilient capability can fling out the individual granules that penetrate the gap around the seal. When using dry concentrate in powder form, seals made from thermoplastic material, which do not have the same resilient capability as rubber, can also be used.

Another alternative for dosing is offered by the linear feeder.

A linear feeder according to the invention moves the dry concentrate in a straight line.

A cylinder with a reciprocating piston rod with two pistons mounted on it is provided for this purpose. The cylinder is connected to the storage container in such a way that the piston rod can drive into the dry concentrate when the cylinder opens. It is an advantage if the dry concentrate is extracted from the storage container from below. The dry concentrate can then run into the cylinder under gravity. At the same time, the cylinder is closed at the bottom by the second piston.

After the cylinder has filled, the piston rod with the two pistons is withdrawn until the piston away from the storage container exits from the cylinder. In this way the cylinder opens and the dry concentrate can pour down into the activator container.

It is an advantage if the cylinder is connected tightly to the storage container.

The pistons then simultaneously form a seal for the storage container. The seal is important to keep the dry concentrate dry. A one-piece construction of the cylinder and the storage container is an advantage.

Optionally the connection with the activator container can also be sealed or it can be more or less open. It is an advantage if the cylinder protrudes into the inlet opening of the activator container. This prevents any dry concentrate coming out of the cylinder falling beside the inlet opening of the activator container.

Optionally the pistons are of a usual construction.

Alternatively, it is envisaged that the pistons can be formed by two sealing discs.

The piston facing the storage container can be designed in the form of a disc. For the other piston, a hat-shaped or mushroom-shaped or cone-shaped design is preferred, so that this piston has sloping sides for the dry concentrate to run off.

In addition, the lower sealing disc can be in the form of a membrane so that it is totally flexible and forms a seal by contacting the inner wall of the cylinder with its sealing lips.

The other piston constructed as a sealing disc can also be in the form of a membrane or be equipped with sealing lips. If necessary, the upper sealing disc is additionally equipped with an O-ring.

The seal is increased if, between two dosing processes, the piston rod remains in a position where both pistons are in the cylinder.

The two sealing discs can be manufactured with the piston rod as a plastic injection molding. This is extremely cost-effective for large batches.

The piston rod can be driven from above through the storage container. There is also no objection to having a closed casing for the storage container if the casing is sufficiently flexible and the piston rod can be engaged with the casing from above, or if the piston rod drive can be connected with the piston rod indirectly via the flexible casing in a different way.

The drive can also be arranged at the side and can also reach into the cylinder through a slot provided for the purpose.

The drive can also be taken from below. Indeed, for this purpose the drive can be arranged beneath the cylinder and even built into the activator container. However, it is preferable for a rod feeding out of the cylinder from below to be provided, which leads to a drive arranged at the side.

The drive can be in the form of a toothed belt drive or a linear motor drive or a reciprocating cylinder drive or a spindle drive or a toothed rack drive. The same dosing cycles can be carried out with the linear feeder according to the invention as with the dosing drum.

The production of the suspension or solution takes place in particular in an activator container in which water and concentrate are brought together. The activator container can be round, in shape which is favourable for a movement, in this case a rotary movement, of the bath. As an option, the activator container can also be provided with inserts, which promote a swirling motion of the contents of the container. The movement can be produced by introducing the water through nozzles or, if necessary, also by mechanical agitators.

It is an advantage to arrange at least one nozzle in the area where the concentrate is mixed with the water.

The concentrate can be added before or after the water or at the same time as the water.

The concentrate and the water can be added differently, e.g. the concentrate can be added after injection of a first quantity of water and before injection of the remaining quantity of water. Preferably at least one nozzle is provided at the top in the activator container. The nozzle can be fixed under the rim of the container. It is advantageous for the nozzle to be mounted at an angle.

The objective is either to spray or cover as large an area as possible and/or to create a swirling motion in the suspension or solution. Nozzles or groups of nozzles in the form of slits are best suited for spraying large areas uniformly. An intensive movement of the bath is an advantage in creating an intensive swirling motion. This movement of the bath is preferably achieved by a single nozzle or several nozzles grouped together.

At least one nozzle can also be arranged at the container outlet. Deposits are a particular nuisance at the container outlet. For this reason, the container outlet is rinsed clear by the nozzle positioned there. The nozzle provided there can be arranged and can work in the same or a similar way to that provided at the top on the rim of the container so that a swirling motion of the deposits is produced before the container outlet is opened.

The quantity of fresh water required to activate the nozzles is taken into account when previously filling the activator container, i.e. the quantity of water is reduced by the amount of fresh water required for the later actuation of the nozzles (preliminary filling level). In this way an overflow of the activator container is avoided.

A further function of the nozzles is to clean the activator container after emptying by the addition of further water.

As an option, the mixing water for the production of the suspension/solution is measured out so that, after emptying, only an acceptable amount of dilution of the suspension or solution takes place due to the water running out from the cleaning of the activator container. This applies to the introduction of the suspension or solution into a drainage pipe in need of cleaning.

When the suspension or solution is introduced into a grease trap that is to be cleaned, the quantity of cleaning water, at least in the case of large-volume traps, is not important.

Different solutions are available for adjusting the filling level, the maximum filling level and the preliminary filling level. A common and well-proven solution is the use of level switches. As such, float switches are typically used as level switches. According to the invention, the use of capacitive switches, which are mounted externally on the activator container, is preferred. Mounting them externally reduces the number of internal parts in the activator container and the need for maintenance.

Another solution is a timer circuit. The timer circuit is a possible solution because under constant water inflow conditions it is possible to measure particular filling times both to reach the maximum filling level and also to reach the preliminary filling level. It is true that not all water inflow conditions remain absolutely constant. The water pressure can vary considerably. However, the measurable times remain within relatively close limits, so that these times can be used via a time switch for switching off the water feed. As an option, it is possible to use a common time switch with an adequate number of switching contacts for both these switching operations and for the switching operations associated with the concentrate feed.

An overflow is provided in the event that a fault should occur in switching off the water feed. As an option, the overflow is combined with the container outlet. An advantageous embodiment provides for a hollow plug as a closure for the container outlet. The hollow plug is of such a length that its upper end coincides with the maximum filling level and any excess water can run out through the top of the hollow plug.

The hollow plug is optionally raised and guided by means of a rod or by a ring-shaped lifting mechanism arranged on the foot of the plug. A magnet is suitable as a lifting drive as only a relatively short stroke is required to actuate the container outlet.

For the hollow plug to be effective, a seal is necessary at its lower end.

The hollow plug, which acts as an overflow, is fitted with a cone-shaped cover at the top to prevent a loss of dry concentrate through the hollow plug/overflow. The conical shape is intended to deflect any dry concentrate that falls onto it.

If this feature is not desirable, it can be avoided by moving the outlet opening of the storage container to one side so that it is no longer above the inlet opening of the activator container. Conversely, the inlet opening can also be moved. There is then an eccentricity in relationship to the center.

In another variation of the invention, an advantageous activator container is created. Here, the invention starts from the knowledge that it is an advantage for the activation of the enzymes and bacteria if the mixture remains in the activator container for a period of time and at the same time is subjected to movement. Indeed, a circulating motion is favourable and can be produced by an agitator and the form of construction described above. An additional vertical circulation of the bath is even better.

As an option, the speed of movement can be limited at the same time. This is based on the knowledge that some enzymes and bacteria cannot survive and are destroyed, or are at least stunted in their growth, when subjected to high mechanical loads at high pump speeds.

According to the invention, provision is made in such cases to reduce the usual pump speed from 3000 rpm. Depending upon the construction of the pump, the maximum speed for sensitive enzymes and bacteria can be 1500 rpm, for more sensitive enzymes and bacteria 500 rpm and for highly sensitive enzymes and bacteria 100 to 300 rpm.

A pump with variable speed is of particular advantage here.

Additional advantages result from the use of a controlled feed of air, as is known per se. The correct amount of air can be determined by means of a small number of trials by increasing and reducing the amount of air supplied.

Even if the desired mixture has already been achieved in a short period of time, e.g. within one minute, the desired growth of the enzymes and bacteria dictates a longer stay in the activator container. As a rule the duration of the stay is at least 0.5 h but not longer than 24 h.

As an option, the vertical movement can be realised by drawing off the suspension/solution from near the bottom and reintroducing the liquid near the top of the container.

It is preferred to produce the vertical movement according to the invention by subjecting only the liquid in the container to a drive in the vertical direction. According to the invention, a pump rotor/impeller/vaned wheel, which in itself is unsuitable, arranged at the bottom of the container, can be used for this purpose. Such pump rotors/impeller wheels are in themselves unsuitable for vertical movement as they form a circulating agitator and produce only a rotation of the liquid in one plane.

However, according to the invention, a vertical movement is produced because the container according to the invention is equipped with inserts or profiles that direct the flow. The inserts or profiles preferably form ribs that run vertically. According to the invention, the height of the ribs is chosen in proportion to the dimensions of the container. For circular containers, the height of the ribs or their web height is at least 10% and at most 50% of the radius of the container. Greater web heights are actually possible and to a great extent do not cause any harm, but are viewed as being uneconomic.

The ribs extend along the inner wall of the container and preferably start at the bottom of the container. At the top there can be a gap between the ribs and the lid of the container. The gap should preferably be at least ¼ of the diameter of the container and the length of the ribs a maximum of ¾ of the diameter of the container.

The rotor/impeller wheels have a suction opening in the middle. The suspension/solution that enters is thrown radially outwards due to the rotational motion. A vacuum is created in the middle at the suction opening. The suspension/solution is sucked in from above and drawn downwards. At the same time, the suspension/solution that is forced radially outwards is steered upwards to flow back to the center at the surface of the bath or below the surface of the bath. A rolling flow is set up.

The rotor/impeller wheels according to the invention form pumps arranged internally. Externally arranged pumps can also be used in place of these pumps or can work together with the internally arranged pumps.

A rolling flow according to the invention is also set up with the pump rotor/impeller wheels described above without inserts to guide the flow by an angled arrangement of the activator container.

The diameter of the container can vary within wide limits. Preferred embodiments have a container diameter of 200 mm. With the rotor/impeller wheel arrangement according to the invention, at the bottom of the container, the container length/height is not more than 8 times the diameter of the container. Favourable ratios are given by a ratio of 1:1 of container diameter to container length or height. At the same time, the quantity of water required according to the process and the constructional outlay as well as the outlay on bearings for the diameter of the pump rotor/impeller wheels must be taken into account. For this reason, the invention concentrates on one (at the most three) rotor/impeller/wheel diameter, e.g. 200 mm, and achieves the required container volume by appropriately increasing or decreasing the container length/height. The rotor/impeller/vaned-wheel diameter is preferably from 100 to 300 mm.

A further parameter of the pump rotor/impeller/vaned wheel according to the invention is its height above the bottom face of the container. In a preferred construction the height is from 10 to 30 mm, e.g. 20 mm. The height can vary depending upon the height of the container. The ratio of the height of the pump rotor/impeller/vaned wheel to the height of the container is at least 1:30 and at most 1:3.

After the desired activation/growth of the enzymes and bacteria in the activator container has been reached, the suspension/solution is supplied to the point of its intended use. To ensure that emptying takes place in a short time, the suspension/solution can optionally be pumped out. The pump can have a further pump rotor/impeller/vaned wheel for other purposes. The further pump rotor/impeller/vaned wheel is preferably used for circulating or mixing the bath to accelerate the growth.

Advantageously, the mechanisms of both pumps can sit on the same shaft, i.e. the pump rotor/impeller/wheel for the circulation/mixing of the bath in the container and the pump rotor/impeller/wheel for pumping out the suspension/solution or emptying sit on one shaft/axle. A fixed arrangement is thus possible without a clutch or gears if the mechanism of the pump for extracting/emptying the suspension is arranged beneath the mechanism of the pump for extracting or mixing the suspension and if the mechanisms cause a flow effect in only one direction of rotation. The flow effect in only one direction of rotation occurs by freewheeling on the shaft in the non-flow direction or by means of a special shape of the mechanisms. Such a shape is formed for example by vanes in the shape of an arc, which extend from the shaft/axle in a radial direction to the wall of the container. The shaft/axle can be formed by a tube and/or a pin. The vanes extend on the arc from the middle to the outer edge, the front of the arcs defining the flow direction and the rear the direction of rotation that does not have any flow effect. The radius of the arcs is at least equal to one quarter of the rotor/impeller/wheel diameter and preferably less than half of the rotor/impeller/wheel diameter.

The front sides of the arcs of the lower pump mechanism preferably point in the opposite direction of rotation in relation to the front sides of the arcs of the upper pump mechanism.

Advantageously, the vanes are stabilised by a common, ring-shaped disc. The ring-shaped disc has an opening in the center through which the suspension/solution is sucked out and in the preferred embodiment experiences a radial motion at the vanes towards the outer wall of the container.

The outflowing suspension/solution can be collected at the outer wall by means of a ring-shaped channel and fed to an outlet.

It is an advantage if the ring-shaped disc lies at the top of the lower pump mechanism and forms a channel for the suspension/solution to be emptied. This effect can be increased if the container wall seals as tightly as possible with the pump mechanism or the disc as appropriate via the ring-shaped channel while maintaining the necessary play. The same applies to the ring-shaped disc on the upper pump mechanism. There, the formation of the channel effects an improvement of the circulation capacity. The ring-shaped disc for the lower pump mechanism, which is arranged at the top of the lower pump mechanism, also contributes to the formation of the channel for the upper pump mechanism.

If the outside diameters of the two pump mechanisms are equal, the circulation flow at the outer edge of the upper pump mechanism is established by means of an adequate gap with the inner wall of the container. The gap also exists if the seal with the lower pump mechanism mentioned above is formed by a web running around the circumference of the container wall and directed inwards.

Due to the formation of the channel according to the invention, it is possible to turn the two pump mechanisms simultaneously. When operating the pump mechanism for circulating or mixing the suspension/solution, the pump mechanism for emptying is turned with it in the direction in which it does not effect any flow. The reverse is true when the pump mechanism for emptying is operated and the pump mechanism for circulating or mixing is turned with it.

As an option, the two pump mechanisms sit so as to be able to rotate on a common tube. At the same time, one mechanism can also form a pin/retainer on which the other mechanism sits.

As an option, one pump mechanism also has a tube, or one pump mechanism is also connected to a tube, on which the other pump mechanism sits.

The tube can be used as an air feed. Just small quantities of air are sufficient to activate the enzymes and bacteria. These small quantities of air are optionally drawn in by the vacuum forming in the middle of the pump mechanism for circulating or mixing. At the same time, the quantities of air can be limited by using passages of small cross section. In the case of an activator container with a diameter of 200 mm and with an equal height, for a mixture of 30 gr of enzymes and bacteria in water and with air being drawn in by means of the resulting vacuum, an entry/exit opening of just 1 mm diameter can be sufficient.

Advantageously, individual and several components used in accordance with the invention can also be used independently of the production of the suspension/solution in situ. For example, the dosing system according to the invention can also be used to dispense the dry concentrate directly into a grease trap.

The production of the suspension/solution according to the invention can also be used to introduce grease solvent into a drainage pipe remotely.

In the same way, the production of the suspension/solution according to the invention can be arranged before or after a siphon used as an odour seal.

Or, the mixing device can be used in conjunction with dosing scales.

Or, the production of the suspension/solution can be used to dilute and dispense liquid concentrate.

Or, the production of the suspension/solution can be used wholly or in part in other areas of life, e.g. for the preparation of beverages from dry concentrate in the foodstuffs area or, in the chemical area, for mixing solid materials in liquids or for the production of solutions.

In as far as figures for diameter are given above and in other embodiments containers with non-circular cross sections are used, a circular cross section with the same surface area as that of the other configuration is defined and used as a reference basis for the diameter figures.

Further characteristics of the invention are described in the claims.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

FIGS. 9A, 9B, 9C, and 9D show four views showing the operation of a linear feeder;

DESCRIPTION OF THE PREFERRED EMBODIMENT

Figure 1:
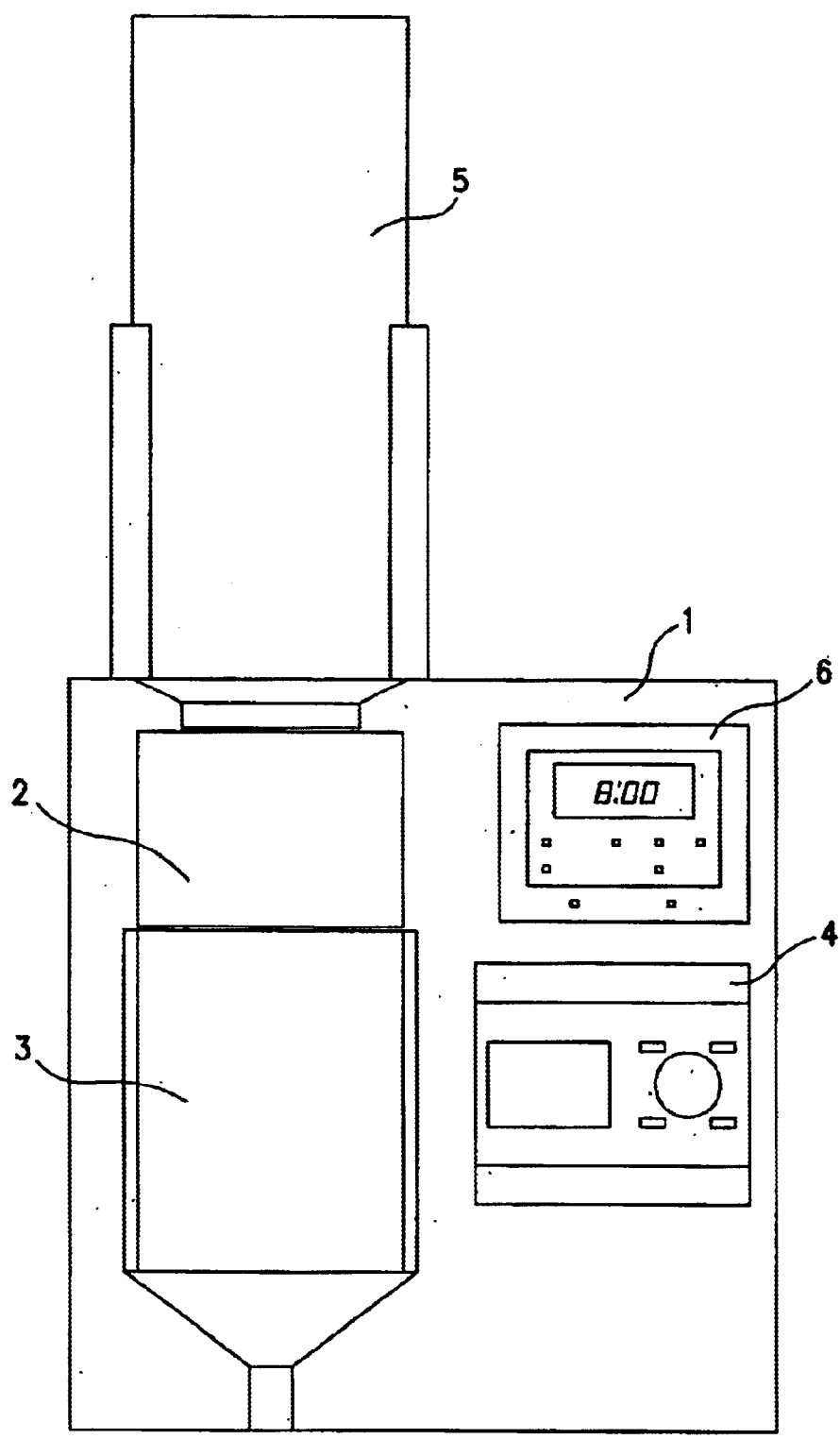
FIG. 1 is a schematic general view of a device for the production of a solvent with a dry concentrate and for dispensing the solvent.

The drawing shows an embodiment of the invention:

FIG. 1 shows a schematic general view of a device for the production of a grease solvent with a dry concentrate and for dispensing the grease solvent. The device according to the invention was developed to measure out powder enriched with bacteria, to dissolve it in water, to activate it and to measure out the solution.

The device measures out an amount of dry concentrate in the form of powder with the necessary, initially inactive substances into an activator container 3 at least once per day under the control of a time switch 6. Here they are dissolved in the water during a residence period, activated and subsequently washed into the drainage pipe.

In a further embodiment of the invention, the time switch is equipped with a date display and freely programmable rest days, so that weekends and public holidays or even business holidays for a meat or sausage factory when no work takes place and there is therefore no incidence of grease, can be excepted from the dosing.

On the other hand, in a restaurant, weekends and public holidays are regular working days and rest days fall during the week.

The freely programmable rest days put the system out of action. This saves the user the superfluous cost of unneeded concentrate and relieves the environment of excessive feeds of concentrate.

The programming enables the unit to work autonomously without further attention.

The device consists of a storage container 5, the dosing drum 2 for measuring out the powder, the activator container 3 for mixing and preparing the solution and the controller 4, which makes fully automatic operation possible. All parts are mounted on a plate 1.

The storage container 5 is formed by a flask. The time switch 6 gives a contact to start the dosing process. The controller 4 is a microcontroller that controls and monitors the progress of the dosing process.

In another embodiment the time switch and the microcontroller form a single unit.

A working cycle consists essentially of the following steps, the activator container being filled before the start of the first cycle:

Empty activator container 3

Introduce a measured quantity of water (in other embodiments a different sequence with the water is envisaged)

Introduce a measured quantity of powder

Wait until the powder has dissolved or until sufficient growth has taken place

Empty and rinse activator container 3

Fill activator container 3

The cycle is run once per day. The start is set by the time switch 6.

Figure 3:
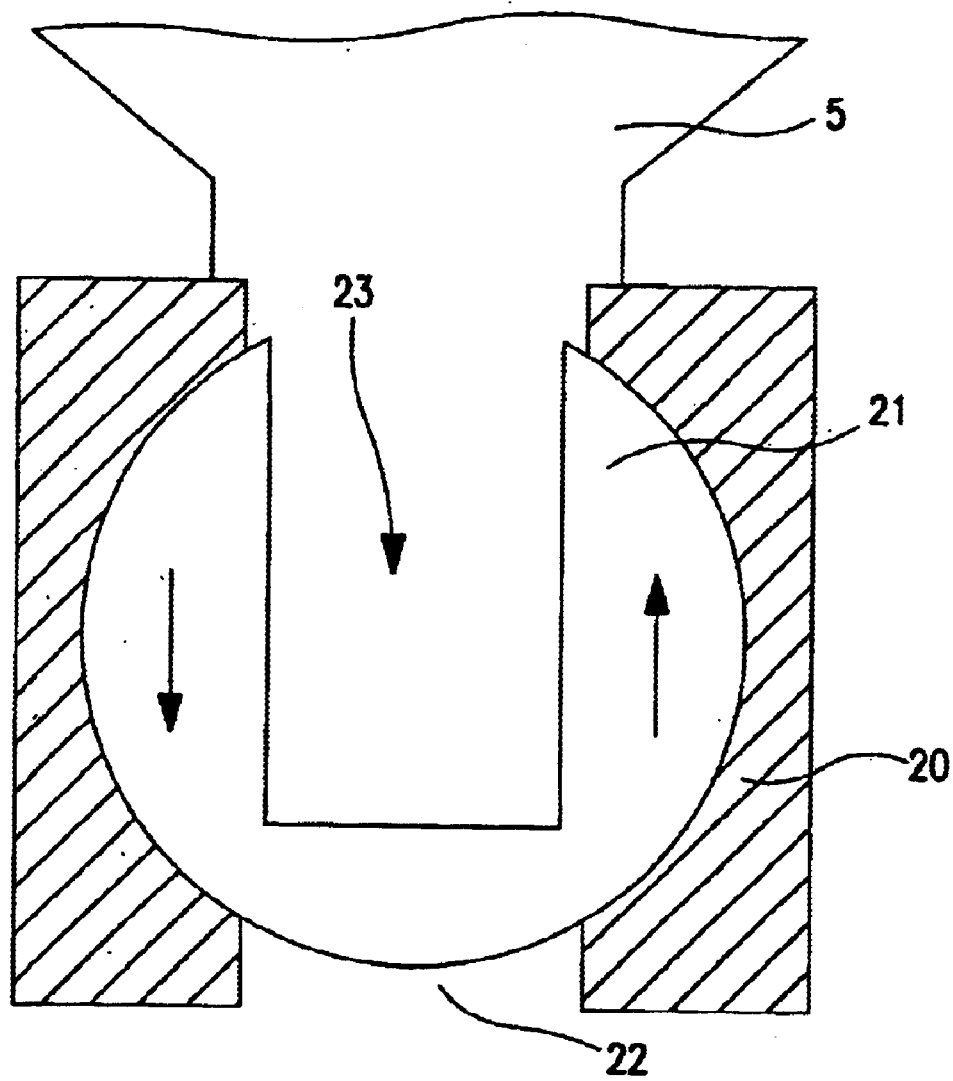
FIG. 3 shows the dosing drum in a system representation.

FIG. 3 shows the dosing drum 2 in a system representation. In detail, a drum cross section 21 with a pocket 23 can be seen. The drum is mounted in a housing 20, which has a shaft 22 top and bottom. The shaft at the top defines the outlet opening of the storage container and serves to receive the powder emanating from the storage container 5. The powder enters the pocket 23, the volume of which corresponds to the volume of powder to be measured out. In the position shown with the opening uppermost the drum takes up the required amount of powder. After rotating through 180 degrees downwards, it dispenses it into the shaft 22. The shaft at the bottom defines the inlet opening of the container 3. The drum makes a full revolution for one dosing, as indicated by the two arrows.

In a preferred mode of operation, the dosing drum remains in the emptying position immediately after emptying until a new dosing process is required. By this means the activator container is sealed and no moisture can penetrate from the activator container into the storage container and activate the dry concentrate there too early.

It is also possible to turn the dosing drum back to the filling position after emptying. Then moist air from the activator container is carried with it and penetrates into the pocket 23. However, depending upon the dry concentrate and the mode of operation, the moist air does not cause any damage worth mentioning as a result of premature activation.

In further possible modes of operation the drum is turned between emptying and refilling in such a way that the pocket runs at right angles to the vertical. In this position the pocket 23 with the enclosed air is sealed. The drum is only turned back to the vertical for filling.

In the embodiment the vertical line runs through the center of the outlet opening of the storage container and through the center of the inlet opening of the activator container.

The drum also opens up other modes of operation, namely the possibility of arranging the pocket at an angle in the filling position by turning the drum, so that the dry concentrate slides into the pocket down an inlet slope. A corresponding position is also possible when emptying, so that the concentrate slides down an outlet slope into the mixing container 3 when emptying.

The inlet slope and/or the outlet slope can remain unchanged over a period of time due to the drum being held in position, or be changed by continuous turning of the drum. The change can then be controlled at will by varying the drum speed.

Figure 2:
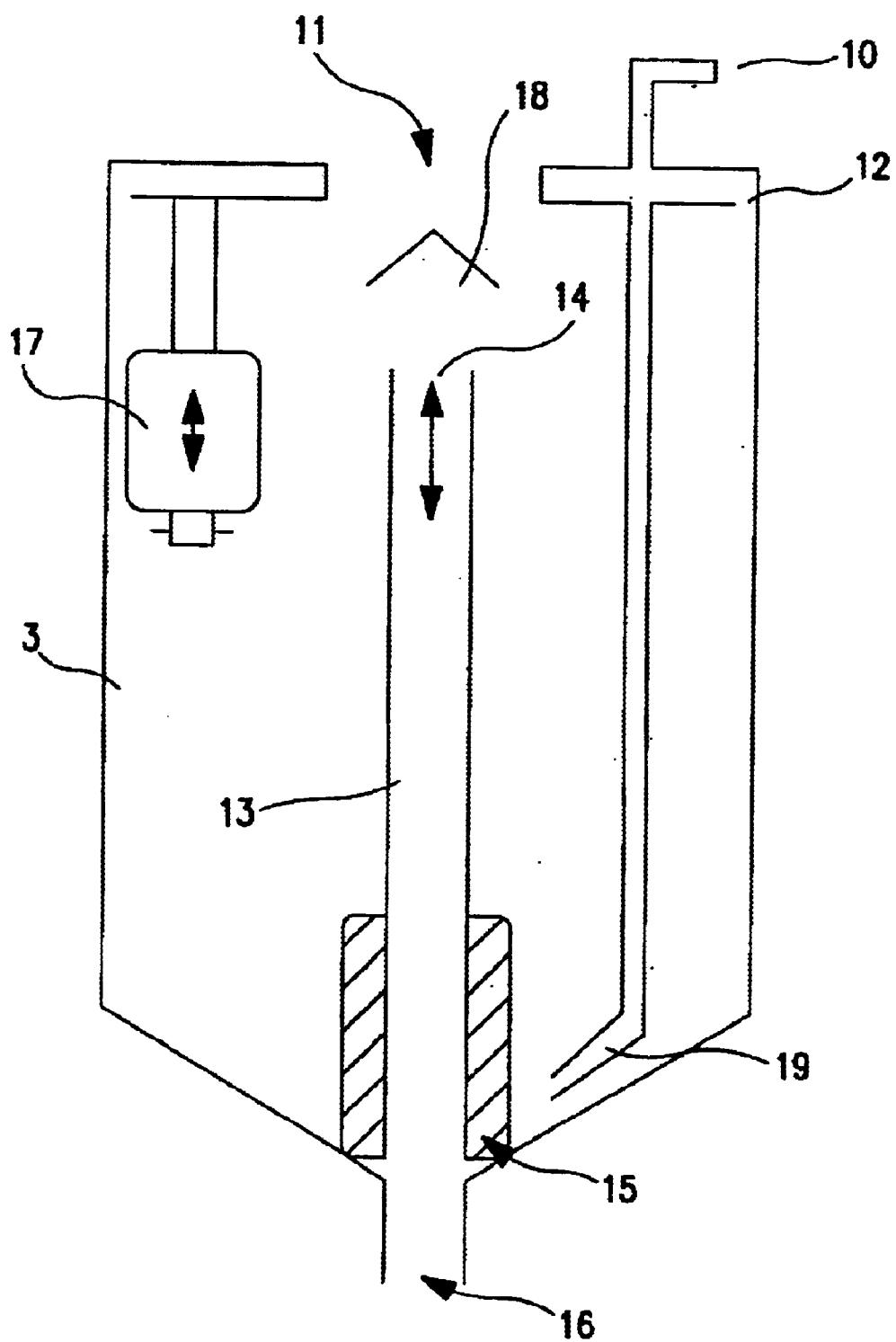
FIG. 2 shows the activator container with its individual components.

FIG. 2 shows the activator container 3 with its individual components. It is designed as a cylinder with a funnel-shaped base and has an opening 11 at the top through which the powder is introduced from the dosing drum 2. The water inlet 10 joins to a ring main at the upper rim of the container. Here, the water comes out of several nozzles 12. The nozzles 12 are arranged at an angle on the circumference of the container and are intended to coat and clean the container wall.

Furthermore, a nozzle 19 is provided on the outlet 16 of the container, which is also supplied from the above-mentioned ring main. The nozzle 19 is directed towards the outlet 16 so that it sprays the outlet and stirs up the powder on mixing. Due to the particular arrangement of the nozzles 12 and 19, the liquid in the activator container 3 is put into a vigorous circular motion, which guarantees a good mixing process and subsequently reliably rinses the activator container 3 clean.

In further embodiments that are not shown, a nozzle is fed through the container lid and/or through the container wall into the activator container and is there set tangentially and/or horizontally and/or at an angle pointing downwards. This arrangement puts the suspension or solution into rotation with great efficiency and effects a mixing and subsequent cleaning with corresponding efficiency.

The outlet 16 of the container is arranged centrally in the funnel-shaped base of the container and fitted with a hollow plug 13. The hollow plug 13 has a seal 15 at the bottom and a ring-shaped closure. This opens and closes the outlet 16 by raising and lowering the plug 13. At the same time, the hollow plug 13 forms an overflow by means of a tubular extension, which rises up as far as the maximum filling level. Water flowing in above this level runs out through the hollow plug 13.

In another embodiment, the outlet of the activator container is arranged off-center in order to prevent concentrate falling from above or concentrate sinking through the suspension or solution being deposited immediately on top of the outlet.

A cone-shaped cover 18 is provided over the hollow plug 13, which prevents powder from being lost into the outlet.

Furthermore, a build up of dust can be avoided by previously coating the surfaces of the container with water and/or by intensive spraying with water when emptying and/or by short emptying intervals followed by mixing.

When the maximum filling level is reached, a float switch 17 is activated. The float switch 17 interrupts the water supply.

The individual functions appear as follows:

The power supply is switched on before the first working cycle and subsequently the mixing container 3 is filled with fresh water, and the time taken to reach the maximum filling level (activation of the float switch 17) is measured. The time measured is used in the manner described below.

When measuring out the powder, a certain, pre-calculated amount of powder is put into the activator container 3 with the help of the dosing drum 2. At the same time the dosing drum 2 forms a seal, which prevents moisture from getting into the storage container 5. The dosing drum 2 runs in a housing, the walls of which form a seal with the drum.

In the embodiment, the storage container 5 can hold a supply of powder for 30 days.

After the powder has been measured out into the empty activator container 3, water is added. The powder is swirled up in the water with the help of the nozzle 19 in the lower part of the activator container 3. An amount of water is added such that the surface of the water lies below the maximum permissible level. In this way it is possible to add further water before the container outlet 16 is opened without overfilling the activator container 3. It is then necessary to wait for several hours until the powder has dissolved and the bacteria are activated in the solution.

In a further embodiment, the solution/suspension is continuously circulated. Deposits are prevented by the continuous movement and within certain limits of movement the growth is accelerated.

A deposit can form around the container outlet 16 during the activation. After the waiting time has expired, further water is added in order to stir up the deposit. Immediately afterwards, the activator container 3 is emptied while being constantly rinsed. To ensure that even hard deposits are removed from the activator container, further subsequent rinsing is carried out at intervals.

After rinsing the activator container 3 empty, it is filled with water for the duration of the rest period until the next dosing. In this way, no crusts can form from slight powder residues, which can then lead to a malfunction. A second reason for filling is to measure the filling time before the maximum filling level is reached. With the measured filling time it is possible to have the water supply turned off by a time limit.

FIGS. 4 to 8 show a further activator container according to the invention.

Dry concentrate in the form of powder is scattered into the activator container 30 through an opening 33 as in the embodiments according to FIGS. 1 to 3. Water enters at the same time through an opening 34. Furthermore, the activator container 30 is closed by a lid 32 and a container base forms part of the activator container.

It is intended that the dry substance dissolves in the water in the activator container 30. The solution should be agitated in a turbulent manner over a long period of time while small amounts of air are introduced.

The activator container 30 is constructed in the shape of a cylinder. The inside diameter is 200 mm. In the activator container 30 is an agitator that has two functions:

a.) during mixing, the agitator sets the suspension in continuous motion so that the powder is fully dissolved and cannot be deposited on the bottom of the activator container. Vertical ribs 31 are fitted on the inside of the activator container 30. They affect the motion in such a manner that the turbulent flow of the suspension takes place in a radial vertical plane. By this means, the powder is swirled up during the whole of the mixing process.

b.) after mixing, the agitator works as a rotary pump, which pumps the solution out of the activator container 30.

Figure 7:
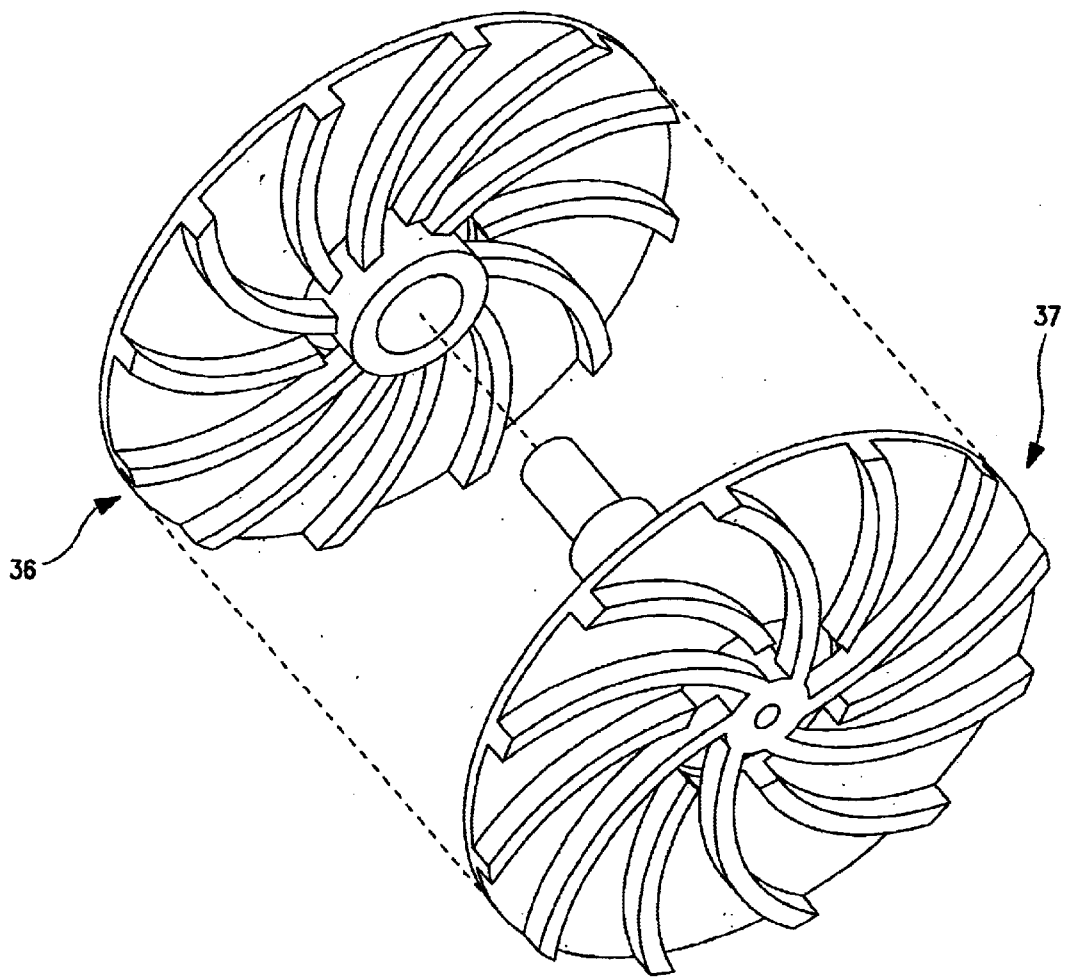
FIG. 7 is perspective view of a pair of agitator wheels in separated attitude.

Two vaned wheels 36 and 37 made from plastic form part of the agitator. These are injection-molded parts. The vaned wheels 36 and 37 lie at the bottom of the activator container 30 and are arranged one above the other. The vaned wheels 36 and 37 are shown individually in FIG. 7 in a detailed view and in FIG. 8 in a detailed view.

Here it can be seen that a centrally arranged tubular piece, from which the vanes extend, forms part of the vaned wheel 36. The vanes are arranged in the form of an arc. Their radius is greater than ¼ of the diameter of the vaned wheel and less than half the diameter of the vaned wheel, in the embodiment ⅜ of the diameter of the vaned wheel. This pattern of the vanes ensures that the suspension between the vanes is pushed radially outwards when the vaned wheel turns in an anticlockwise direction (seen from below in the view in FIG. 7). When rotating in the opposite direction, the suspension is prevented from moving radially outwards.

In the embodiment, the flow effect of the vaned wheel 36 occurs when it rotates in an anticlockwise direction because the fronts of the arcs of the vanes point in this direction.

A ring-shaped disc is formed at the top of the vaned wheel 36. This disc has various tasks. It contributes to the stability and forms a channel, which promotes the mixing function.

Figure 4:
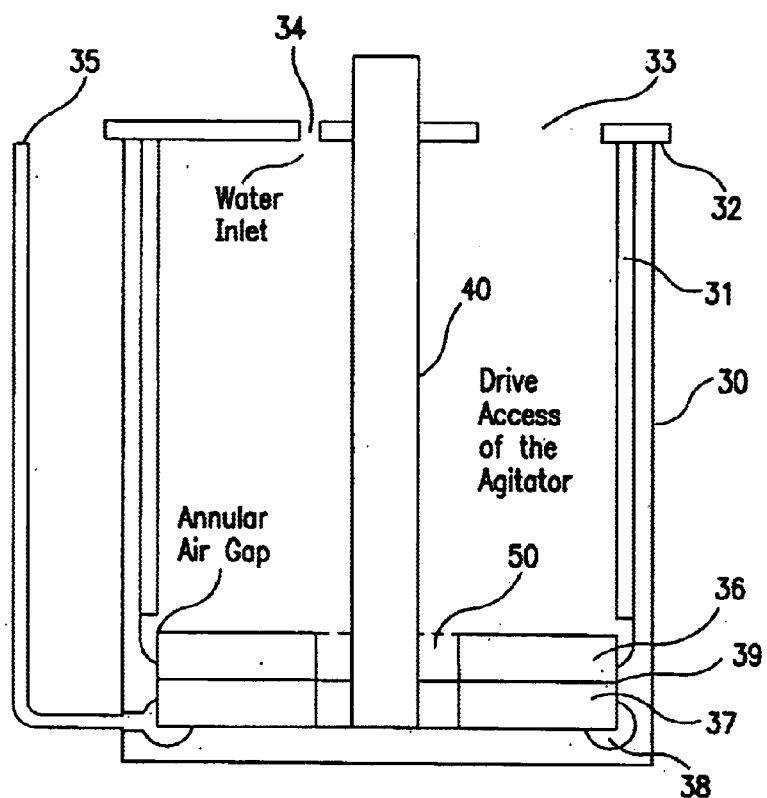
FIG. 4 is a side elevation of the activator container showing particularly a pair of agitator wheels.

Internally, the ring-shaped disc leaves a passage/inlet opening 50, which is shown schematically in FIG. 4 without the vanes of the vaned wheel, free for the suspension.

A central tube 40 forms part of the vaned wheel 37, from which the vanes extend towards the inner wall of the container in the form of an arc. The construction and the pattern of these vanes correspond to those of the vaned wheel 36 with one difference: the arcs face in the opposite direction so that a flow effect occurs when the vaned wheel 37 rotates in a clockwise direction. When rotating in an anticlockwise direction, the suspension that has penetrated between the vanes flows radially towards the middle of the container.

The vaned wheel 37 has a ring-shaped disc at the top in the same manner as vaned wheel 36.

Figure 8:
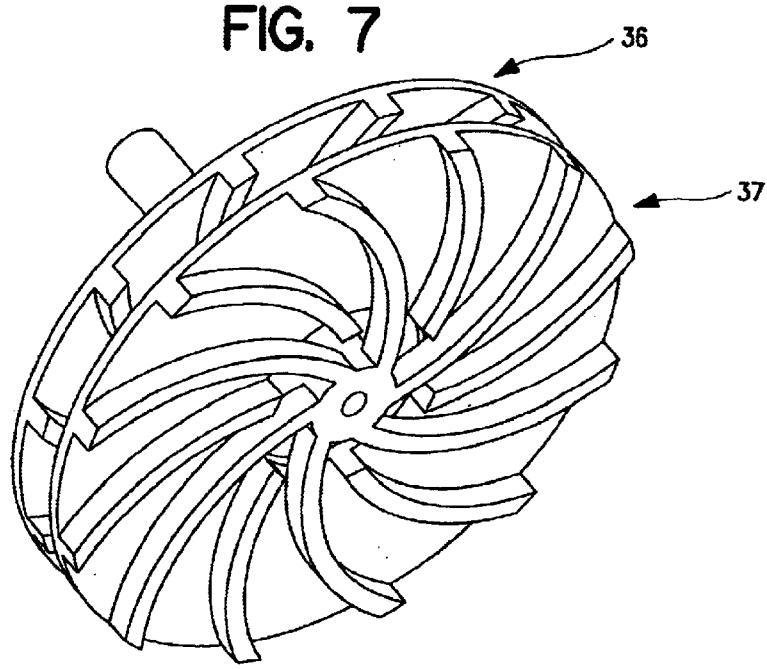
FIG. 8 is a view similar to FIG. 7 showing the two agitator wheels in joined attitude.

In the assembly shown in FIG. 8, the vaned wheel 36 sits firmly on the tube 40 of the vaned wheel 37 in the direction of rotation so that when the tube 40 rotates both vaned wheels are moved.

A channel exists between the two ring-shaped discs of the two vaned wheels 36, and the same between the bottom of the container and the ring-shaped disc of the lower vaned wheel 37.

The activator container 30 encloses the two vaned wheels 36 and 37 while leaving a degree of play necessary for rotation with a web 39. However, the width of the web is chosen so that the suspension is forced to flow vertically upwards out of the channel between the two ring-shaped container walls and the ribs 31 provided there when the rib height (in a radial direction) is 20 mm. At the same time, the suspension is drawn in through the inlet opening 50 when the vaned wheel 36 is turned in an anticlockwise direction.

Figure 5:
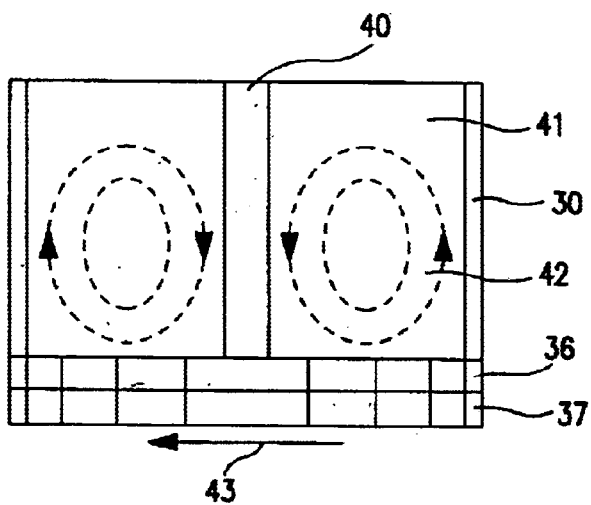
FIG. 5 is a view similar to FIG. 4 and showing the flow direction in the agitator container.

The direction of rotation is shown schematically in FIG. 5 and designated as 43. The resulting vertical flow is designated with 42. The flow 42 is a circular turbulent flow. The vertical ribs 31 on the inner wall of the container prevent a tangential flow. In this sense, the vaned wheel 36 acts as an agitator.

The agitator is kept operating until the desired activation of the enzymes and bacteria is achieved. In the embodiment a duration of 2 h is provided for.

During this activity, the vaned wheel 37 has no flow effect/function.

Small amounts of air are required to activate the enzymes and bacteria in the water. These are introduced into the suspension through a narrow channel in the tube 40 and through a drilled hole, which is not shown. The drilled hole is in the area of the vaned wheel 36. A vacuum is established here, which draws the air into the suspension.

In another embodiment, which is not shown, the air is measured in using an integral pump.

Figure 6:
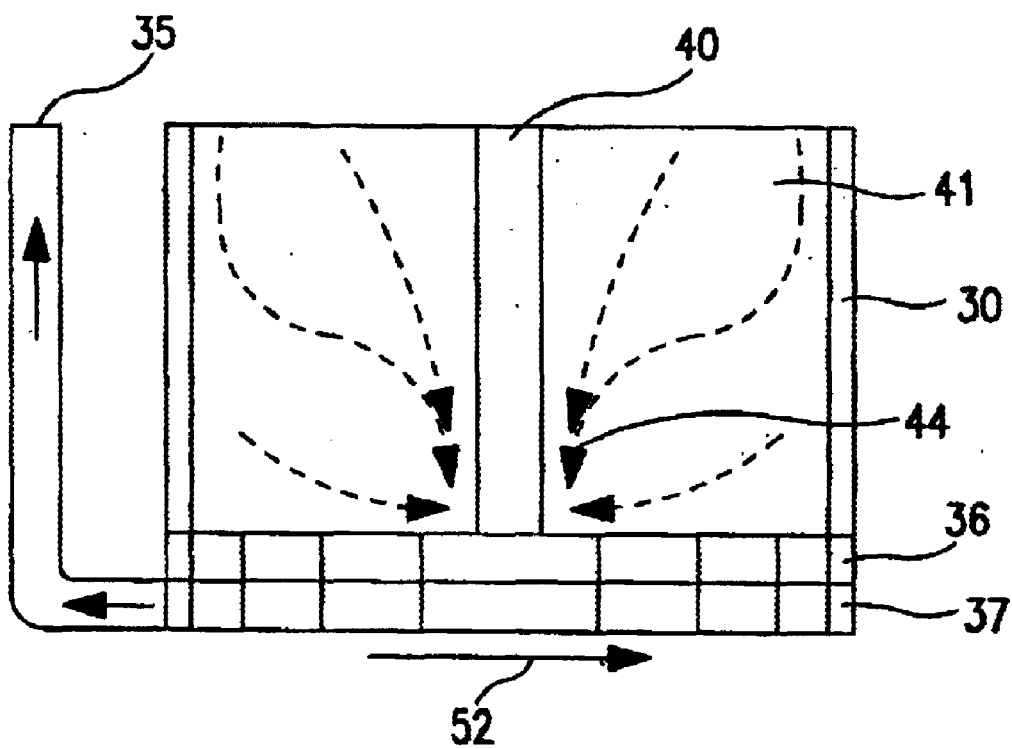
FIG. 6 is a view similar to FIG. 5 showing the emptying of the activator container.

After activation, the direction of rotation of the agitator is reversed. The vaned wheel 36 thus loses its circulatory effect while the vaned wheel 37 begins to act as a turbine pump. In FIG. 6 the new direction of rotation is designated by 52.

The suspension is sucked in through the inlet opening 50 by the vaned wheel 36. In FIG. 6 the resulting flow is designated by 44 and the suspension by 41.

The suspension sucked in is forced into a circumferential channel 38 by the vaned wheel 37 and from there into an outlet 35. The outlet 35 leads into a drainage pipe that is contaminated with grease.

Figure 10B:
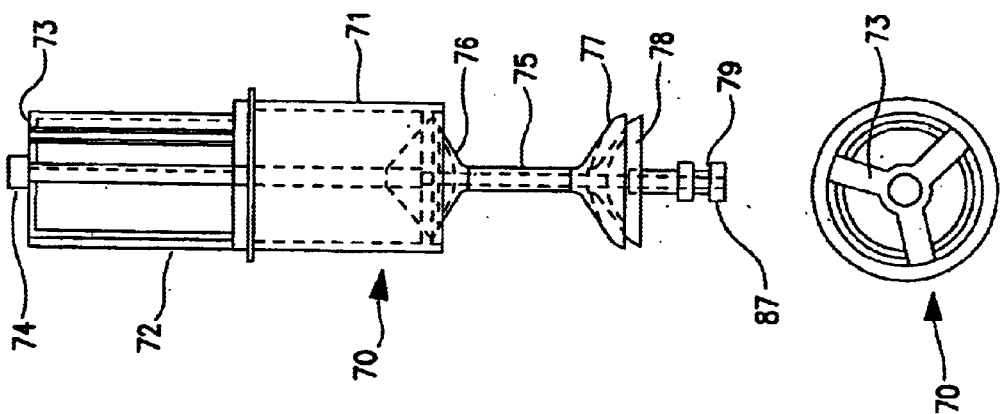
FIGS. 10A and 10B are diagrammatic views showing different drive devices for a linear feeder.
Figure 10A:
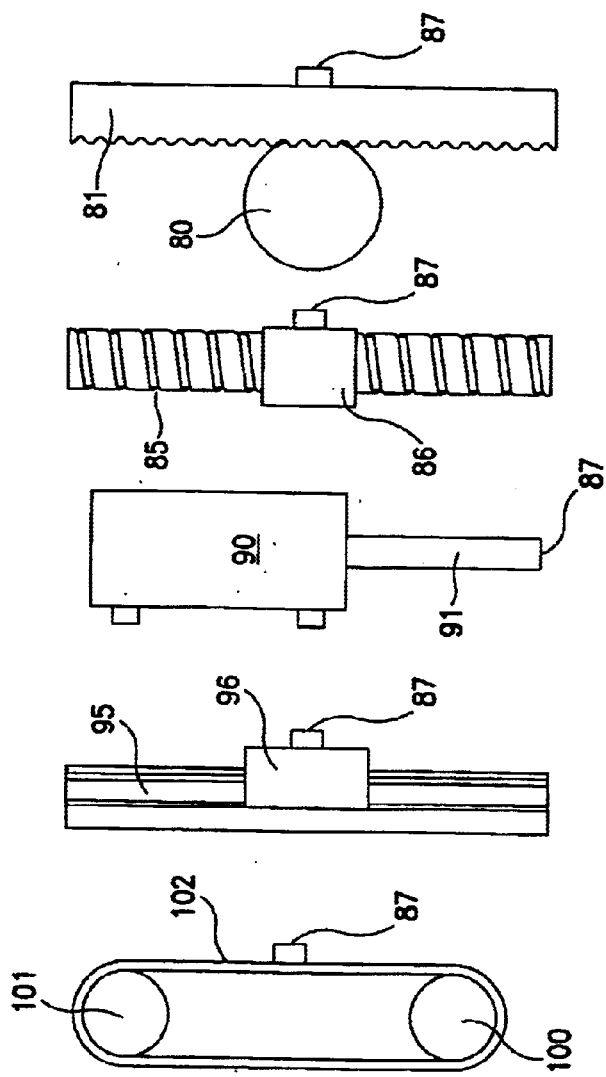

FIGS. 9A, 9B, 9C, and 9D show a linear feeder in four different operating positions. FIG. 10A shows different drives for the linear feeder.

In the embodiment, the storage container is a flask 60 with a neck 61 in which there is a cylindrical opening. In other embodiments, a container made from soft plastic is provided, which is force-fitted or screwed onto a cylindrical piece.

A piston rod 63 with two pistons 64 and 65 is arranged in the opening in such a way that it can slide. Together with the pistons 64 and 65, the piston rod 63 forms a plastic injection-molded part. The plastic injection-molded part also allows sealing lips (not shown) to be formed on the piston 64.

The piston 65 is in the form of a hollow cone, with the outer ends forming a membrane-type sealing lip.

FIG. 9A shows the starting position of the linear feeder. Here, the neck of the flask 61 is sealed by the two pistons 64 and 65. There is no dry concentrate in the neck of the flask 61.

FIG. 9B shows the piston stroke for filling the intermediate space between the two pistons 64 and 65. Here the pistons are driven upwards.

Next, the pistons are pulled downwards. On the way, the pistons pass through a position shown in FIG. 9C, which is the same as FIG. 9A but with the difference that the intermediate space between the two pistons 64 and 65 in the neck of the flask 61 is filled with dry concentrate.

The end position for the pistons is shown in FIG. 9D. The lower piston 65 has been withdrawn from the neck of the flask, but only so far that the upper piston is still making a sealing contact with the neck of the flask 61 and that a gap has formed through which the dry concentrate can run out. This is considerably assisted by the outlet slope of the lower piston 65.

From the emptying position of FIG. 9D, the pistons 64 and 65 are pushed back into the starting position of FIG. 9A. In doing so, the upper piston 64 pushes the neck of the flask clear once more, and the dry concentrate that has gathered there is pushed out of the neck of the flask and back into the storage container.

FIG. 10A shows a side view of a linear feeder 70, which is made completely as a plastic component. FIG. 10B shows a top view of the linear feeder 70.

The piston rod is designated by 75 and the cylinder by 71.

In contrast to the linear feeder of FIGS. 9A–9D, an additional guide piece with webs 72 and 73 and a guide bush 74 is provided. The three webs 72 run parallel to the axis of the cylinder. The three webs 73 run radially and connect the webs 72 with the bush 74.

The piston rod 75 is designed to have a length such that, in the lowest position (emptying position), it is still guided in the bush 74. With the help of the guide piece, the piston rod is always guided at two points and tilting is prevented. The webs 72 and 73 are sufficiently spaced to guarantee that the dry concentrate runs in safely and that the dry concentrate is safely pushed back.

Furthermore, the guide piece prevents the filling pressure from becoming excessive.

The pistons in FIG. 10A are also different from the embodiment in FIGS. 9A–9D. The lower piston has two cone-shaped membranes 77 and 78. This results in a multiple sealing and the sealing is improved.

The upper piston is also constructed as a cone-shaped membrane 76 but arranged, displaced by 180 degrees with respect to the membranes 77 and 78, on the piston rod 75. In this way, the pressure of the concentrate strengthens the seal. The connection for the piston drive is to be found on the end 79.

FIG. 10A shows five different variations of drive, namely a toothed rack drive, a spindle drive, a reciprocating cylinder drive, a linear motor drive and a belt drive.

The toothed rack drive includes a toothed rack, which is movably arranged in a linear guide, and a driving pinion. The piston rod is coupled to the toothed rack at 87.

In another embodiment, the toothed rack is part of the piston rod.

By turning the pinion, the toothed rack is moved backwards and forwards in a longitudinal direction. A stepper motor as described for the dosing drum is particularly advantageous here.

The spindle drive includes a spindle 85 arranged in two bearings so that it can be rotated but is fixed in an axial direction. In the embodiment, the same motor is provided for the spindle 85 as for the toothed rack drive.

A lead-screw nut 86 runs on the spindle 85. The lead-screw nut 86 is guided in such a way that it is unable to turn but undergoes a movement in the longitudinal direction of the spindle on account of the spindle rotation.

The particular advantage of the spindle drive is a high reduction ratio for the movement of the motor drive.

The connection point of the piston rod 75 with the lead-screw nut, as with the toothed rack drive, is designated by 87. The reciprocating cylinder drive includes a cylinder 90 and a piston rod 91.

The reciprocating cylinder can be actuated electrically, pneumatically or hydraulically.

The connection point of the piston rod 75 with the piston rod 91 is designated by 87 as with the toothed rack drive.

The linear motor drive includes a linear guide 95 and a slide/carriage 96 that can traverse and be driven in/on the guide 95. The connection point of the piston rod 75 with the slide/carriage 96 is designated by 87 as with the toothed rack drive.

The belt drive includes belt pulleys 100 and 101 and a belt 102. One of the belt pulleys is driven. In the embodiment a toothed belt is used. In other embodiments a V-belt is used.

The connection point of the piston rod 75 with the belt is designated by 87 as with the toothed rack drive.

In the embodiments, all parts are made of plastic or stainless steel. In this case, an enzyme- and bacteria-resistant plastic is used. The plastic is POM.

One feature of the invention resides broadly in a process for the clearing of grease by means of a grease solvent with enzymes and bacteria in an aqueous form as the grease solvent and for the clearing of drainage pipes and/or grease traps, characterised in that the grease solvent is produced in situ by combining dry concentrate and water, the water and the dry concentrate first being put into an activator container (3) and activated there, and subsequently introduced into the drainage pipe and/or the grease trap.

Another feature of the invention resides broadly in a process, characterised in that the dry concentrate is circulated and the propagation temperature for the enzymes and/or bacteria is maintained and/or air is introduced into the liquid.

Yet another feature of the invention resides broadly in a process, characterised by the use of concentrate in powder form and/or concentrate pellets and/or concentrate granules.

Still another feature of the invention resides broadly in a process, characterised in that the concentrate is produced by freeze-drying and subsequent grinding and/or by pelletising before and/or after freeze-drying.

A further feature of the invention resides broadly in a process characterised by the pelletising of the starting material between rollers or by squeezing the starting material through nozzles to form strands and then granulating the strands.

Another feature of the invention resides broadly in a process characterised by a classification of the ground material and/or granulated material and/or separation of undersized and/or oversized granules.

Yet another feature of the invention resides broadly in a process characterised in that first the dry concentrate and then the water are put into the activator container and/or the resulting suspension or solution is put into the drainage pipe at the latest at the grease trap or at a comparable position.

Still another feature of the invention resides broadly in a process characterised by a cleaning of the activator container with water after emptying the suspension into a drainage pipe or into a grease trap.

A further feature of the invention resides broadly in a process characterised by the production of the dry concentrate by way of freeze-drying.

Another feature of the invention resides broadly in a process characterised in that the effectiveness of the suspension or solution is set by a proportion of dry concentrate of from 4 to 100 grams per liter.

Still another feature of the invention resides broadly in a process characterised in that the residence time of the dry concentrate in the activator container (3) is at least 0.5 hours.

A further feature of the invention resides broadly in a process characterised in that filling times for the activator container are measured and/or the activation time is measured.

Another feature of the invention resides broadly in a process characterised in that separation/deposition is avoided by a movement of the bath in the activator container and/or by rinsing the container after emptying of the container.

Yet another feature of the invention resides broadly in a process characterised in that the suspension or solution is fed intermittently or continuously into the drainage pipe or into the grease trap.

Still another feature of the invention resides broadly in a process characterised in that the introduction of the suspension or solution takes place independently of the incidence of grease and/or dependent upon the incidence of grease.

A further feature of the invention resides broadly in a process characterised in that matching to the incidence of grease takes place by measurement of the waste-water flow or dependent on time independently of flow rate.

Another feature of the invention resides broadly in a process characterised in that the measured incidence of grease is entered into a computer, which controls the application of the suspension or solution using this measurement, or in that a fixed amount of suspension or solution determined by experience or by trials is applied and/or the fixed amount is fed into the drainage pipe in portions.

Yet another feature of the invention resides broadly in a process characterised in that suspension or solution is put into the drainage pipe at least daily and/or no application takes place at weekends, on public holidays or when the business is closed.

Still another feature of the invention resides broadly in a process characterised by the use of an ADP control with freely programmable rest days.

A further feature of the invention resides broadly in a process characterised in that the suspension or solution is applied during the cessation of business between two consecutive working days.

Another feature of the invention resides broadly in a process characterised by the use of a time switch and/or a controller (4) to actuate the parts of the apparatus.

Yet another feature of the invention resides broadly in a process characterised by a time switch with several switching intervals for one or more functions of the suspension/solution production or for the production of the solution.

Still another feature of the invention resides broadly in a process characterised by the use of a storage container (5), a linearly or circularly operating dosing device arranged beneath the storage container (5) for the dosing of dry concentrate into an activator container (3) arranged beneath this, the dosing device feeding the amount of dry concentrate envisaged for the dosing into the activator container (3) for mixing with water or dissolving in water as appropriate in one or more steps.

A further feature of the invention resides broadly in a process characterised by the use of a dosing drum (2) or a cell wheel or dosing scales or a linear feeder.

Another feature of the invention resides broadly in a process characterised by the use of a drum with at least one recess or pocket (23) on its circumference.

Yet another feature of the invention resides broadly in a process characterised in that, after emptying into the activator container, the drum or the linear feeder remains in the emptying position until the next dosing process.

Still another feature of the invention resides broadly in a process characterised in that, immediately after emptying into the activator container, the drum is turned or the linear feeder is moved until the recess in the drum is sealed with respect to the activator container or the filling opening of the linear feeder is sealed.

A further feature of the invention resides broadly in a process characterised in that, immediately after emptying, the drum or the linear feeder is returned to the filling position if this is not detrimental to the dry concentrate.

Another feature of the invention resides broadly in a process characterised in that the drum is turned for emptying until the recess in the drum forms an angled outlet surface in the emptying position.

Yet another feature of the invention resides broadly in a process characterised in that, after emptying, the drum is turned to seal the opening until the recess is at right angles to a line which passes through the center of the outlet opening of the storage container and through the center of the inlet opening of the activator container.

Still another feature of the invention resides broadly in a process characterised in that, for filling, the drum is turned until the recess forms an angled inlet surface in the filling position.

A further feature of the invention resides broadly in a process characterised in that the angled inlet or outlet surface remains unchanged over a period of time by stopping the drum or is controlled by varying the speed of the drum.

Another feature of the invention resides broadly in a process characterised by the use of a dosing drum (2) or cell wheel whose recess/pocket (23) has a pick-up volume that is less than the amount of dry concentrate envisaged for one production process.

Yet another feature of the invention resides broadly in a process characterised by the use of the same dosing drums or cell wheels for different quantities of dry concentrate and by changing the dosing movements to suit the change in quantities.

Still another feature of the invention resides broadly in a process characterised by the use of a stepper motor for the drive to the dosing drums or cell wheels.

A further feature of the invention resides broadly in a process characterised by the use of a circuit selected from limit switches for step control, electronic controllers, speed measurement, measurement of angle of pivot and a pulse-controlled motor or a combination of several of these.

Another feature of the invention resides broadly in a process characterised by the use of a dosing drum that can rotate clockwise and/or anticlockwise and/or the rotational speed of which is controlled.

Yet another feature of the invention resides broadly in a process characterised by the use of a drum housing with a continuous shaft opening running through it and a dosing drum arranged so that it can rotate within the housing.

Still another feature of the invention resides broadly in a process characterised by the use of a dosing drum which is connected to a drive motor via a gear.

A further feature of the invention resides broadly in a process characterised by the use of a key-slot connection between the dosing drum and the gear and/or the use of a gear that simultaneously forms a drum controller.

Another feature of the invention resides broadly in a process characterised by the use of a gear consisting of a toothed wheel and a pinion on the drive shaft of the motor.

Yet another feature of the invention resides broadly in a process characterised by the use of a gear designed as a cam controller.

Still another feature of the invention resides broadly in a process characterised by the use of a seal and/or a sealing medium on the dosing drum or on the linear feeder as appropriate.

A further feature of the invention resides broadly in a process characterised by the use of a rubber seal when using pellets and/or a seal made from a thermoplastic material when using powder.

Another feature of the invention resides broadly in a process characterised by the use of a seal arranged on the outlet side of the dosing drum in the gap between the dosing drum and the surrounding housing.

Yet another feature of the invention resides broadly in a process characterised by the use of a composite seal or a one-piece seal.

Still another feature of the invention resides broadly in a process characterised by the use of a molded part as a seal and/or of O-rings and straight sealing lips lying between the O-rings.

A further feature of the invention resides broadly in a process characterised by the use of a linear feeder consisting of a cylinder with a reciprocating piston rod and two pistons mounted on the piston rod spaced apart from one another, and where the cylinder is connected to the storage container and the piston drives into the storage container when it moves backwards and forwards so that dry concentrate penetrates between the two pistons and is drawn out of the cylinder on the next stroke of the piston.

Another feature of the invention resides broadly in a process characterised by the use of a linear feeder arranged vertically beneath the storage container.

Yet another feature of the invention resides broadly in a process characterised by the use of two sealing discs as pistons.

Still another feature of the invention resides broadly in a process characterised by the use of a linear feeder whose lower piston in the vertical position is equipped with an outlet slope.

A further feature of the invention resides broadly in a process characterised by the use of a piston rod, which together with the two pistons forms a plastic injection-molded part.

Another feature of the invention resides broadly in a process characterised by the use of a lower piston, which is constructed as a membrane seal and/or is mushroom-shaped or hat-shaped or cone-shaped.

Yet another feature of the invention resides broadly in a process characterised by the use of plastic pistons with molded sealing lips.

Still another feature of the invention resides broadly in a process characterised by the use of multiple seals on one piston and/or the use of pistons on the storage container side with the same configuration as the lower piston but mounted displaced by 180 degrees.

A further feature of the invention resides broadly in a process characterised by the use of a cylinder molded onto the storage container or the use of a storage container with a cylindrical outlet opening matched to the piston rod and the pistons.

Another feature of the invention resides broadly in a process characterised by the use of a piston rod with a belt or chain drive or a linear motor drive or a reciprocating cylinder drive or a spindle drive or a toothed rack drive.

Yet another feature of the invention resides broadly in a process characterised by the use of toothed belts or V-belts.

Still another feature of the invention resides broadly in a process characterised by the use of pistons where the piston nearest the storage container is provided with an O-ring and the other piston is provided with a sealing lip.

A further feature of the invention resides broadly in a process characterised in that the piston rod is brought into a position in which both pistons are within the cylinder in order to seal the storage container.

Another feature of the invention resides broadly in a process characterised by the use of an attached flask as a storage container and where the neck of the flask forms the cylinder.

Yet another feature of the invention resides broadly in a process characterised by the use of a guide piece and/or inlet piece positioned before the cylinder.

Still another feature of the invention resides broadly in a process characterised by the use of one or more water nozzles (12, 19) in the activator container for pre-coating and/or mixing and/or cleaning.

A further feature of the invention resides broadly in a process characterised in that water and dry concentrate are added alternately.

Another feature of the invention resides broadly in a process characterised in that mixing takes place between the feed intervals.

Yet another feature of the invention resides broadly in a process characterised by the use of nozzles (19) at the base of the container and/or at the upper rim of the container and/or nozzles in the lid of the container and/or in the container wall and/or in the container.

Still another feature of the invention resides broadly in a process characterised in that the dry concentrate is first fed into the activator container (3) and then the water nozzles (19) in or at the base of the container are actuated.

A further feature of the invention resides broadly in a process characterised in that water is fed into the activator container (3) up to a preliminary filling level.

Another feature of the invention resides broadly in a process characterised in that after the activation time has expired, a further movement of the suspension or solution bath in the activator container (3) takes place.

Yet another feature of the invention resides broadly in a process characterised by actuation of the water nozzles (12, 19) for further movement of the bath and for mixing.

Still another feature of the invention resides broadly in a process characterised in that the quantity of water used for moving the bath and for mixing is at the same time used totally or in part for activating the enzymes and bacteria or in that water is drawn off at the same time from another point.

A further feature of the invention resides broadly in a process characterised by an actuation of the water nozzles (12, 19) for cleaning.

Another feature of the invention resides broadly in a process characterised by the use of nozzles (12, 19) mounted at an angle and/or tangentially.

Yet another feature of the invention resides broadly in a process characterised by the use of nozzles (12, 19) which are directed against the container wall and/or into the container outlet (16).

Still another feature of the invention resides broadly in a process according to one or more of claims 63 to 74, characterised by the continuous or intermittent supply of water to the nozzles (12, 19).

A further feature of the invention resides broadly in a process characterised by the control of the water supply in the activator container by means of a level switch (17) and/or a time switch.

Another feature of the invention resides broadly in a process characterised by the use of a float switch or a capacitive switch arranged on the outside of the activator container.

Yet another feature of the invention resides broadly in a process characterised by the use of an activator container with an overflow or a plug closure.

Still another feature of the invention resides broadly in a process characterised by the use of a sieve before the outlet/exit opening of the activator container when pellets and/or concentrate granules are used.

A further feature of the invention resides broadly in a process characterised by the use of a hollow plug (13) at the outlet (16) of the container, whose open, tubular, upward-protruding end, acting as an overflow, determines the maximum filling level.

Another feature of the invention resides broadly in a process characterised by the use of a cone-shaped cover (18) for the overflow.

Yet another feature of the invention resides broadly in a process characterised by the use of an activator container in which the outlet of the container is not arranged exactly vertically beneath the dry concentrate feed.

Still another feature of the invention resides broadly in a process characterised by the use of a concentrate distributor.

A further feature of the invention resides broadly in a process characterised by the use of a baffle surface for the distribution of concentrate.

Another feature of the invention resides broadly in a process characterised by the use of a revolving baffle surface.

Yet another feature of the invention resides broadly in a process characterised in that a vertical movement of the bath also takes place.

Still another feature of the invention resides broadly in a process characterised by the use of horizontally rotating pump rotors and/or pump impellers and/or pump wheels.

A further feature of the invention resides broadly in a process characterised by the use of pump rotors/impellers/wheels, which are arranged on the base of the container and are matched to the base of the container.

Another feature of the invention resides broadly in a process characterised in that the horizontal flow is deflected into a vertical flow.

Yet another feature of the invention resides broadly in a process characterised by the use of pump rotors/impellers/wheels whose height above the base of the container to the height of the container is at least 1:30 and at most 1:3.

Still another feature of the invention resides broadly in a process characterised by the use of pump rotors/impellers/wheels whose height is from 10 to 30 mm.

A further feature of the invention resides broadly in a process characterised by the use of two pump rotors/impellers/wheels arranged one above the other, of which the upper is intended for circulation or mixing and the lower for pumping out.

Another feature of the invention resides broadly in a process characterised by the use of a shaft/axle on which both pump rotors/impellers/wheels sit, and where each rotor/impeller/wheel effects a flow in a different direction of rotation and runs freely with the other when rotating in the non-flow direction.

Yet another feature of the invention resides broadly in a process characterised by the use of pump rotors/impellers/wheels with bent vanes, where the vanes of one rotor/impeller/wheel are bent in the opposite circumferential direction to the other rotor/impeller/wheel.

Still another feature of the invention resides broadly in a process characterised by the use of vanes with a bending radius that is at least equal to ¼ of the diameter of the rotor/impeller/wheel and at most equal to ½ of the diameter of the rotor/impeller/wheel.

A further feature of the invention resides broadly in a process characterised by the use of flow-guiding inserts and/or profiles in the activator container.

Another feature of the invention resides broadly in a process characterised by the use of ribs running vertically on the inside of the container, which extend into the activator container by a distance (height) that is at least 10% and/or a maximum of 50% of the radius of the activator container.

Yet another feature of the invention resides broadly in a process characterised by the use of ribs that end at a distance from the upper rim of the container.

Still another feature of the invention resides broadly in a process characterised by the use of ribs whose distance from the upper rim of the container is at least equal to ¼ of the diameter of the container.

A further feature of the invention resides broadly in a process characterised by the use of ribs that have a length, which at maximum is equal to ¾ of the diameter of the container and/or which start from the base of the container.

Another feature of the invention resides broadly in a process characterised by maintaining a constant container diameter and matching the height of the container or the length of the container to a desired container volume and/or a container length, which at maximum is equal to 8 times the container diameter.

Yet another feature of the invention resides broadly in a process characterised in that an activator container is used whose diameter is between 100 and 300 mm.

Still another feature of the invention resides broadly in a process characterised in that the suspension/solution is pumped out after the desired growth of the enzymes and bacteria is reached.

A further feature of the invention resides broadly in a process characterised in that the same pump is used for the vertical movement of the bath as for pumping out and vice versa.

Another feature of the invention resides broadly in a process characterised in that rotors/impellers/wheels are used, which are equipped with a ring-shaped disc at the top.

Yet another feature of the invention resides broadly in a process characterised by the use of ring-shaped discs, which leave an opening free in the center and/or form a seal with the edge of the rotor/impeller/wheel and/or form channels.

Still another feature of the invention resides broadly in a process characterised by the use of two pump mechanisms arranged one above the other in the activator container, of which the lower is intended for emptying and the upper for circulation or mixing.

A further feature of the invention resides broadly in a process characterised by the use of an activator container that encircles the lower pump mechanism with a ring-shaped channel for collecting the liquid.

Another feature of the invention resides broadly in a process characterised by the use of pumps whose central opening and/or the channel at least in the area of the suction opening is equipped with a filter cover.

Yet another feature of the invention resides broadly in a process characterised by the use of an activator container that encircles the two pump mechanisms with a web, which ends at the ring-shaped disc of the lower pump mechanism.

Still another feature of the invention resides broadly in a process characterised by the use of pump mechanisms, of which one pump mechanism is equipped with a tube and the other pump mechanism sits on the tube.

A further feature of the invention resides broadly in a process characterised in that air is introduced into the suspension or solution through the tube.

Another feature of the invention resides broadly in a process characterised in that the pump speed is maintained at less than 1500 rpm at least during the circulation process.

Yet another feature of the invention resides broadly in a process characterised in that the pump speed is maintained at less than 500 rpm.

Still another feature of the invention resides broadly in a process characterised in that the pump speed is maintained at between 100 and 300 rpm.

A further feature of the invention resides broadly in a process characterised in that the pump speed is increased when pumping out.

Another feature of the invention resides broadly in a process characterised by the use of a speed-controlled pump.

Yet another feature of the invention resides broadly in a process characterised in that the air provided for activating the enzymes and bacteria is sucked in by the same pump mechanism as is used for the circulation or mixing and/or is measured in by a separate pump.

Still another feature of the invention resides broadly in a process characterised by the use of an air pipe leading into the negative-pressure zone of the pump mechanism for the circulation.

A further feature of the invention resides broadly in a process characterised by an angled arrangement of the activator container.

Another feature of the invention resides broadly in a process characterised by the use of bacteria-resistant and enzyme-resistant materials.

Yet another feature of the invention resides broadly in a process characterised by the use of sprayed Teflon and/or polyethylene (PE) and/or polypropylene (PP) and/or polyoxymethylene (POM) and/or stainless steel for one or more parts of the apparatus.

Still another feature of the invention resides broadly in a process characterised in that when the device is arranged before a siphon when viewed in the direction of waste water flow, the siphon is rinsed through at least once when or after the suspension or solution is run off.

A further feature of the invention resides broadly in a process characterised by the use of anti-blocking agents in the dry concentrate.

Another feature of the invention resides broadly in a process characterised by the use of pumice or chalk as an anti-blocking agent.

Figure 11:
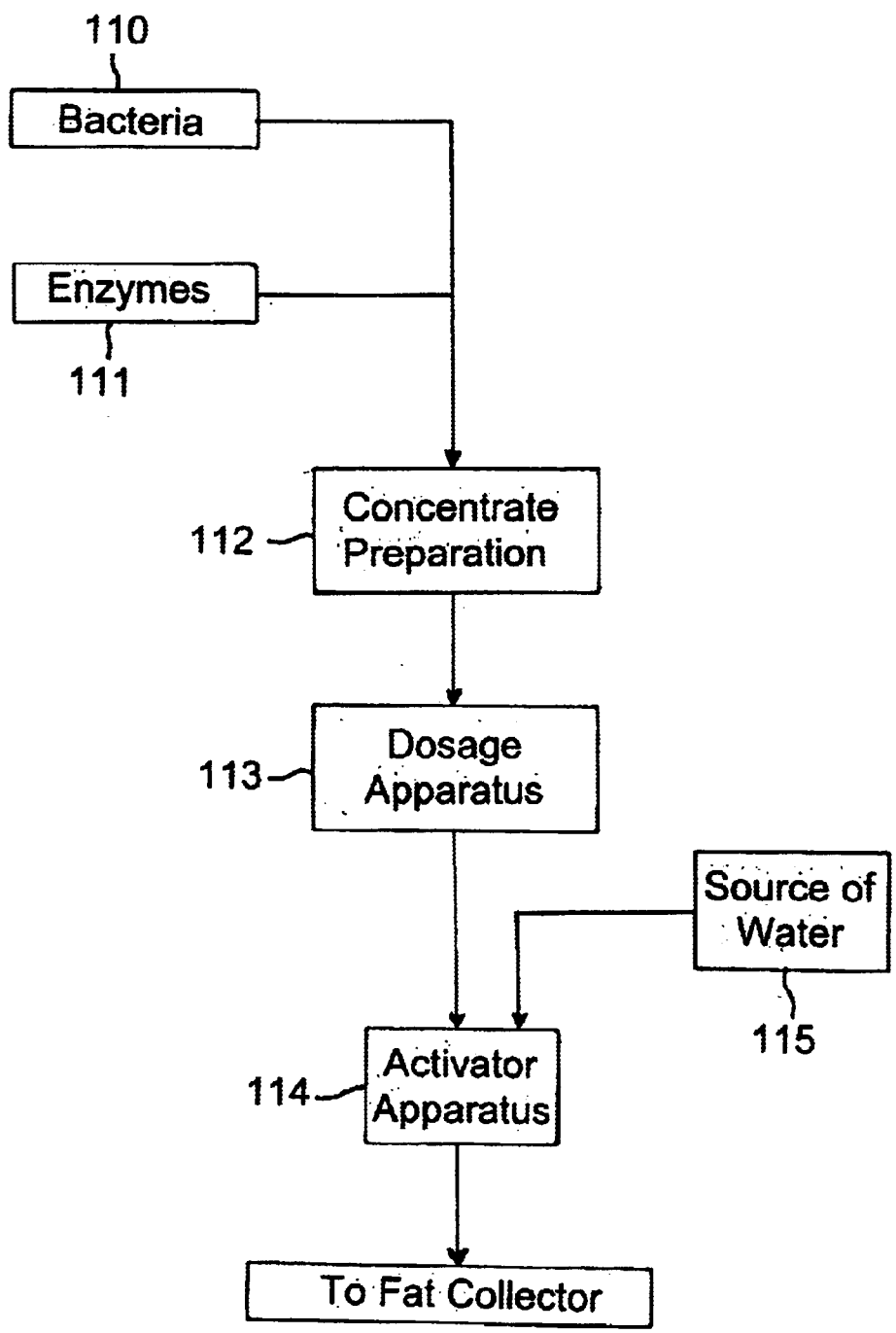
FIG. 11 is a simplified block flow diagram showing an embodiment of a method in accordance with the present invention.

With reference to FIG. 11, in steps 110 and 111 bacteria either alone or together with enzymes are passed to step 112 for preparation of a dry concentrate. This may be a freeze-dried concentrate or agent comprised of bacteria and enzymes. Properly sized concentrate is passed to a dosing or dosage apparatus, step 113, and from there to an activation apparatus, step 114, in which the concentrate is added to water which is supplied in step 115. In accordance with one embodiment of the invention, the concentrate is added to provide an amount from the range of 4 to 100 grams per liter of water. The residence time in the activator step 114 is typically at least 30 minutes, prior to the suspension being passed to a fat collector.

The dry concentrate or agent in accordance with the present invention may, for example, have any value of concentrate in the range of from 4 grams per liter of water to 100 grams of dry concentrate per liter of water, for example, 50 grams of dry concentrate per liter of water. Thus, the amount of dry concentrate is not limited to the first and final values of the range, but can comprise any value between them.

The apparatus of the invention generally comprises a data processor device comprising a RAM programmed control apparatus for dosing aqueous solvent in controlled manner to waste water pipes and/or grease traps. The apparatus also comprises a storage container for dry agent and a dosage apparatus; with said dosage apparatus being disposed beneath said storage container; and said dosage apparatus being configured to perform one of: linearly operating mode and circularly operating mode.

The above first paragraph indicating that the invention relates to the clearing of grease by means of a grease solvent, in particular with enzymes and bacteria as the grease solvent and for the clearing of drainage pipes and grease traps is to include a method of cleaning waste water pipes and/or grease traps containing fatty residues and/or grease, said method or process comprising the steps of: providing a dry agent comprising: bacteria and enzymes; mixing said dry agent comprising bacteria and enzymes with an amount of water sufficient to cause in-situ production of an aqueous mixture; maintaining said aqueous mixture in an activator vessel structure to activate said aqueous mixture for a time sufficient to form an aqueous solvent for cleaning fatty residues and/or grease; contacting said waste water pipes and/or grease traps containing fatty residues and/or grease with said aqueous solvent for dissolving said fatty residues and/or grease; and thus cleaning said waste water pipes and/or grease traps by biodigesting fatty residues and/or grease deposited in said waste water pipes and/or grease traps.

Thus, the terminology "method" is to include the terminology "process", and vice versa.

The term gear used herein above is to indicate, inter alia, a transmission for transmitting motive power.

Some examples of bioremediation methods and agents which may possibly be incorporated in an embodiment of the present invention are to be found in: U.S. Pat. No. 4,237,003 issued to El-Sayed on Dec. 2, 1980 and entitled "Process for biological purification of liquid wastes", also referred to above; U.S. Pat. No. 4,670,149 issued to Francis on Jun. 2, 1987 and entitled "Bacterial incubator and method of use", also referred to above; U.S. Pat. No. 4,882,059 issued to Wong et al. on Nov. 21, 1989 and entitled "Solubilization of organic materials in wastewater treatment", also referred to above; U.S. Pat. No. 4,925,564 issued to Francis on May 15, 1980 and entitled "Bacterial incubator and method of use", also referred to above; U.S. Pat. No. 5,225,083 issued to Pappas et al. on Jul. 6, 1993 and entitled "Method for bioremediation of grease traps", also referred to above; U.S. Pat. No. 5,516,687 issued to Perez et al. on May 14, 1996 and entitled "Device and method for maintaining bacterial levels within an organic waste collection container"; U.S. Pat. No. 5,593,887 issued to Glaze et al. on Jan. 14, 1997 and entitled "Method for accelerated bioremediation and method of using an apparatus therefor"; U.S. Pat. No. 5,624,684 issued to Fuisz on Apr. 29, 1997 and entitled "Enzyme systems"; U.S. Pat. No. 5,840,547 issued to Rosenberg et al. on Nov. 24, 1998 and entitled "Bioemulsifiers"; U.S. Pat. No. 5,843,757 issued to Russell et al. on Dec. 1, 1998 and entitled "Enzyme based bioremediation"; U.S. Pat. No. 5,874,292 issued to McMinn, Jr. on Feb. 23, 1999 and entitled "System and method for vent hood cleaning and comprehensive bioremediation of kitchen grease"; U.S. Pat. No. 5,911,877 issued to Perez et al. on Jun. 15, 1999 and entitled "Device for maintaining bacterial levels within an organic waste collection container"; U.S. Pat. No. 6,019,110 issued to McClure et al. on Feb. 1, 2000 and entitled "Parts washing system"; U.S. Pat. No. 6,095,163 issued to McClure et al. on Aug. 1, 2000 and entitled "Parts washing system"; and U.S. Pat. No. 6,126,830 issued to Marshall on Oct. 3, 2000 and entitled "Method and apparatus for treating medical waste water", all of these U.S.

patents being hereby expressly incorporated by reference as if set forth in their entirety herein.

Some examples of bacteria and enzymes, also referred to as concentrate or agent, which may possibly be incorporated in an embodiment of the present invention are to be found in: U.S. Pat. No. 3,711,392 issued to Metzger on Jan. 16, 1973 and entitled "Method for the utilization of organic waste material"; U.S. Pat. No. 3,801,499 issued to Luck on Apr. 2, 1974 and entitled "Sewage treatment"; U.S. Pat. No. 3,961,077 issued to Stitt on Jun. 1, 1976 and entitled "Soluble waste conversion process and pasteurized proteinaceous products"; U.S. Pat. No. 4,018,650 issued to Busta et al. on Apr. 19, 1977 and entitled "Method of production and recovery of protein from flood wastes"; U.S. Pat. No. 4,081,367 issued to Hulls et al. on Mar. 28, 1978 and entitled "Purification of waste water high in carbohydrates and simultaneous production of high protein feed product"; U.S. Pat. No. 4,332,904 issued to Kurane et al. on Jun. 1, 1982 and entitled "Biochemical treatment by microorganic method"; U.S. Pat. No. 5,271,845 issued to Paquin on Dec. 21, 1993 and entitled "Aerobic biological process for treating waste sludge"; U.S. Pat. No. 5,503,766 issued to Kulperger on Apr. 2, 1996 and entitled "Enzymatic solutions containing saponins and stabilizers"; U.S. Pat. No. 5,531,897 issued to Wickham on Jul. 2, 1996 and entitled "Sewage and contamination remediation and materials fo effecting same"; U.S. Pat. No. 5,683,575 issued to Yates et al. on Nov. 4, 1997 and entitled "Apparatus for activation of a digesting agent upstream of organic material treatment"; U.S. Pat. No. 5,840,182 issued to Lucido et al. on Nov. 24, 1998 and entitled "Apparatus and method for biological purification of waste"; U.S. Pat. No. 5,866,002 issued to Yates et al. on Feb. 2, 1999 and entitled "Apparatus for activation of a digesting agent and method of its use"; U.S. Pat. No. 6,083,737 issued to Lawler et al. on Jul. 4, 2000 and entitled "Enzyme-producing strain of *Bacillus Pumilus*"; U.S. Pat. No. 6,140,106 issued to Lawler et al. on Oct. 31, 2000 and entitled "Enzyme-producing strain of *Bacillus Subtilis*"; U.S. Pat. No. 6,150,316 issued to Scepanski on Nov. 21, 2000 and entitled "Solid cast composition comprising a bacterial spore source capable of generating enzymes"; U.S. Pat. No. 6,162,634 issued to Lawler et al. on Dec. 19, 2000 and entitled "Enzyme-producing strain of Bacillus bacteria"; U.S. Pat. No. 6,162,635 issued to Lawler et al. on Dec. 19, 2000 and entitled "Enzyme-producing strain of Bacillus bacteria"; U.S. Pat. No. 6,171,847 B1 issued to Lawler et al. on Jan. 9, 2001 and entitled "Enzyme-producing strain of Bacillus bacteria"; U.S. Pat. No. 6,171,848 B1 issued to Lawler et al. on Jan. 9, 2001 and entitled "Enzyme-producing strain of Bacillus bacteria"; U.S. Pat. No. 6,174,718 B1 issued to Lawler et al. on Jan. 16, 2001 and entitled "Enzyme-producing strain of Bacillus bacteria"; and U.S. Pat. No. 6,177,012 B1 issued to Lawler et al. on Jan. 23, 2001 and entitled "Enzyme-producing strain of Bacillus bacterial, all of these U.S. patents being hereby expressly incorporated by reference as if set forth in their entirety herein.

Some examples of freeze drying apparatus and processes of enzymes and/or bacteria which may possibly be incorporated in an embodiment of the present invention are to be found in: U.S. Pat. No. 3,281,950 issued to Kautz on Nov. 1, 1966 and entitled "Freeze-drying process"; U.S. Pat. No. 3,620,776 issued to Mishkin et al. on Nov. 16, 1971 and entitled "Spray drying process"; U.S. Pat. No. 3,888,017 issued to McBride on Jun. 10, 1975 and entitled "Method for preparation of fine particle size inorganic oxidizers"; U.S. Pat. No. 3,897,307 issued to Porubcan et al. on Jul. 29, 1975 and entitled "Stabilized dry cultures of lactic acid-producing bacteria"; U.S. Pat. No. 3,932,943 issued to Briggs et al. on Jan. 20, 1976 and entitled "Method of preparation of lyophilized biological products"; U.S. Pat. No. 4,053,642 issued to Hup et al. on Oct. 11, 1977 and entitled "Starter culture production"; and U.S. Pat. No. 4,180,917 issued to Neubeck on Jan. 1, 1980 and entitled "Process for freeze-drying enzymes", all of these U.S. patents being hereby expressly incorporated by reference as if set forth in their entirety herein.

Some examples of classification or sizing of particulate matter which may possibly be incorporated in an embodiment of the present invention are to be found in: U.S. Pat. No. 3,275,140 issued to Rasmussen on Sep. 27, 1966 and entitled "Air separator with fluidized discharge"; U.S. Pat. No. 3,670,886 issued to Hosokawa et al. on Jun. 20, 1972 and entitled "Powder classifier"; U.S. Pat. No. 4,296,864 issued to Misaka et al. on Oct. 27, 1981 and entitled "Air classifier"; U.S. Pat. No. 4,560,471 issued to Yamada et al. on Dec. 24, 1985 and entitled "Powder classifier"; U.S. Pat. No. 5,887,725 issued to Tominaga et al. on Mar. 30, 1999 and entitled "Classifier having rotatable dispersion plate"; and U.S. Pat. No. 5,931,305 issued to Akiyama et al. on Aug. 3, 1999 and entitled "Powder classifier", all of these U.S. patents being hereby expressly incorporated by reference as if set forth in their entirety herein.

Some examples of methods and apparatus of pelletizing or similarly agglomerating powdery substances which may possibly be incorporated in an embodiment of the present invention are to be found in: U.S. Pat. No. 4,133,756 issued to Arai et al. on Jan. 9, 1979 and entitled "Method for dehydrating a mixed dust slurry"; U.S. Pat. No. 4,680,157 issued to Hinzpeter et al. on Jul. 14, 1987 and entitled "Circular pelletizing machine and method of controlling the same"; U.S. Pat. No. 4,824,352 issued to Hadley et al. on Apr. 25, 1989 and entitled "Apparatus for pelletizing materials"; U.S. Pat. No. 4,976,907 issued to Brotz on Dec. 11, 1990 and entitled pelletizing roll and method"; U.S. Pat. No. 4,988,275 issued to Hinzpeter et al. on Jan. 29, 1991 and entitled "Rotary pelletizing machine"; U.S. Pat. No. 5,002,607 issued to Flesher et al. on Mar. 26, 1991 and entitled "Process for pelletizing particulate materials"; U.S. Pat. No. 5,033,953 issued to Holley and entitled "Pelletizing disc assembly and control system"; U.S. Pat. No. 5,306,131 issued to Brotz on Apr. 26, 1994 and entitled "Pelletizing roll"; U.S. Pat. No. 5,468,446 issued to Morgan et al. on Nov. 21, 1995 and entitled "Pelletizing or granulating process"; U.S. Pat. No. 5,652,000 issued to Corcoran, Jr. on Jul. 29, 1997 and entitled "Pelletizer particularly suitable for pelletizing water-dispersible melt-extrudate"; and U.S. Pat. No. 6,113,844 issued to Neale on Sep. 5, 2000 and entitled "Process for pelletizing particulate materials", all of these U.S. patents being hereby expressly incorporated by reference as if set forth in their entirety herein.

Some examples of dosing or dosage apparatus and methods which may possibly be incorporated in an embodiment of the present invention are to be found in: U.S. Pat. No. 4,566,491 issued to Aiuola et al. on Jan. 28, 1986 and entitled "Valve especially suitable for use in filling machines"; U.S. Pat. No. 4,676,286 issued to Aiuola et al. on Jun. 30, 1987 and entitled "Volumetric filling machine"; U.S. Pat. No. 4,685,903 issued to Cable et al. on Aug. 11, 1987 and entitled "External infusion pump apparatus"; U.S. Pat. No. 5,255,829 issued to Trumstedt et al. on Oct. 26, 1993 and entitled "Dispenser for discharging pulverous material"; U.S. Pat. No. 5,441,176 issued to Aueé on Aug. 15, 1995 and entitled "Volumetric dry measure apparatus"; U.S. Pat. No. 5,456,585 issued to Stenild on Oct. 10, 1995 and entitled "Positive displacement fluid motor with flexible blades"; and U.S. Pat. No. 5,988,434 issued to Keil et al. on Nov. 23, 1999 and entitled "Dosage withdrawal apparatus", all of these U.S. patents being hereby expressly incorporated by reference as if set forth in their entirety herein.

Some examples of float switches which may possibly be incorporated in an embodiment of the present invention may be found in: U.S. Pat. No. 5,155,311 issued to Utke on Oct. 13, 1992 and entitled "Float switch assembly for submersible pump"; U.S. Pat. No. 5,175,402 issued to Olson on Dec. 29, 1992 and entitled "Mercury float switch"; U.S. Pat. No. 5,231,255 issued to Reichensperger on Jul. 27, 1993 and entitled "Electric float switch comprising an electric connecting cable"; U.S. Pat. No. 5,584,665 issued to Walsh et al. on Dec. 17, 1996 and entitled "Liquid drainage system with pneumatic sensor"; U.S. Pat. No. 5,775,877 issued to Genz on Jul. 7, 1998 and entitled "Submersible motor-driven pump with float switch"; U.S. Pat. No. 5,781,117 issued to Rish on Jul. 14, 1998 and entitled "Water level detector alarm device"; U.S. Pat. No. 5,814,780 issued to Batchelder et al. on Sep. 29, 1998 and entitled "Pivotable float switch within a housing"; U.S. Pat. No. 5,945,913 issued to Gallagher on Aug. 31, 1999 and entitled "Liquid level alarm system"; U.S. Pat. No. 5,999,101 issued to Gallagher on Dec. 7, 1999 and entitled "Liquid level alarm system"; and U.S. Pat. No. 6,140,925 issued to Lee et al. on Oct. 31, 2000 and entitled "Magnetically actuated float switch", all of these U.S. patents being hereby expressly incorporated by reference as if set forth in their entirety herein.

Some examples of water pumps and valves which may possibly be incorporated in an embodiment of the present invention are to be found in: U.S. Pat. No. 4,373,874 issued to Phillips on Feb. 15, 1983 and entitled "Fluid actuated pump system"; U.S. Pat. No. 4,815,941 issued to Fayo on Mar. 28, 1989 and entitled "Automatic water delivery system"; U.S. Pat. No. 4,909,274 issued to Rodriguez on Mar. 20, 1990 and entitled "Valve apparatus"; U.S. Pat. No. 4,911,613 issued to Cox on Mar. 27, 1990 and entitled "Hydraulic ram-type water pump"; U.S. Pat. No. 4,936,742 issued to Eguchi et al. on Jun. 26, 1990 and entitled "Water pump apparatus having lubricating oil circulation and axial thrust support"; U.S. Pat. No. 5,218,986 issued to Farwell on Jun. 15, 1993 and entitled "Pneumatically pressurized water pumping apparatus"; U.S. Pat. No. 5,897,295 issued to Rogers et al. on Apr. 27, 1999 and entitled "Timer controlled pneumatic water pump"; and U.S. Pat. No. 5,901,557 issued to Matté et al. on May 11, 1999 and entitled "Water pump with integral gate valve", all of these U.S. patents being hereby expressly incorporated by reference as if set forth in their entirety herein.

Some examples of methods and apparatus for determining fat in solutions which possibly may be incorporated in an embodiment of the present invention may be found in: U.S. Pat. No. 3,960,493 issued to Beitz et al. on Jun. 1, 1976 and entitled "Method of measuring the fat and protein content in fluids"; U.S. Pat. No. 4,236,075 issued to Nexo et al. on Nov. 25, 1980 and entitled "Apparatus for measuring components of liquid samples"; U.S. Pat. No. 5,017,785 issued to Räsänen on May 21, 1991 and entitled "IR-spectrometric analyzing procedure and means"; U.S. Pat. No. 5,103,181 issued to Gaisford et al. on Apr. 7, 1992 and entitled "Composition monitor and monitoring process using impedance measurements"; and U.S. Pat. No. 5,463,321 issued to Matlock et al. on Oct. 31, 1995 and entitled "Sensor probe for measuring fat and oil stability", all of these U.S. patents being hereby expressly incorporated by reference as if set forth in their entirety herein.

Some examples of timer apparatus and methods which possibly may be incorporated in an embodiment of the present invention are to be found in: U.S. Pat. No. 5,910,739 issued to Stanojevic on Jun. 8, 1999 and entitled "Power-up/interrupt delay timer"; U.S. Pat. No. 5,999,087 issued to Gunton on Dec. 7, 1999 and entitled "Timer and alarm apparatus for controlling delivery of fluid material"; U.S. Pat. No. 6,016,531 issued to Rixner et al. on Jan. 18, 2000 and entitled "Apparatus for performing real time caching utilizing an execution quantization timer and an interrupt controller"; U.S. Pat. No. 6,020,697 issued to Stenger et al. on Feb. 1, 2000 and entitled "Timer for use with an electronic control in controlling an appliance"; U.S. Pat. No. 6,020,775 issued to Chevallier on Feb. 1, 2000 and entitled "Adjustable timer circuit"; U.S. Pat. No. 6,038,197 issued to Phillips on Mar. 14, 2000 and entitled "Timer circuit"; U.S. Pat. No. 6,081,575 issued to Chevallier on Jun. 7, 2000 and entitled "Timer circuit with programmable decode circuitry"; U.S. Pat. No. 6,084,521 issued to Ha on Jul. 4, 2000 and entitled "Waterflow detector with electronic timer"; U.S. Pat. No. 6,100,829 issued to Frederickson et al. on Aug. 8, 2000 and entitled "Method and apparatus for a digital peak detection system including a countdown timer"; U.S. Pat. No. 6,125,404 issued to Vaglica et al. on Sep. 26, 2000 and entitled "Data processing system having a protocol timer for autonomously providing time based interrupts"; U.S. Pat. No. 6,127,867 issued to Phillips on Oct. 3, 2000 and entitled "Timer circuit"; U.S. Pat. No. 6,163,506 issued to Mundy on Dec. 19, 2000 and entitled "Method and apparatus for managing timer objects in an event driven system"; and U.S. Pat. No. 6,176,264 B1 issued to Brundisini et al. on Jan. 23, 2001 and entitled "Programmable electronic self-learning timer for the control of a solenoid valve, particularly for watering systems", all of these U.S. patents being hereby expressly incorporated by reference as if set forth in their entirety herein.

Some further examples of computer systems and methods and their components which may possibly be incorporated in an embodiment of the present invention are to be found in: U.S. Pat. No. 4,034,209 issued to Kashio on Jul. 5, 1977 and entitled "Recording device"; U.S. Pat. No. 4,133,041 issued to Kashio on Jan. 2, 1979 and entitled "Data processing control apparatus with selective data readout"; U.S. Pat. No. 4,546,649 issued to Kantor on Oct. 15, 1985 and entitled "Instrumentation and control system and method for fluid transport and processing"; U.S. Pat. No. 4,615,001 issued to Hudgins, Jr. on Sep. 30, 1986 and entitled "Queuing arrangement for initiating execution of multistage transactions"; U.S. Pat. No. 4,888,747 issued to Lagasse et al. on Dec. 19, 1989 and entitled "General purpose dual mode clock and timer unit"; U.S. Pat. No. 5,134,691 issued to Elms on Jul. 28, 1992 and entitled "Bidirectional communication and control network with programmable microcontroller interfacing digital ICs transmitting in serial format to controlled product"; U.S. Pat. No. 5,204,936 issued to Kaneko et al. on Apr. 20, 1993 and entitled "Process status supervisory system"; U.S. Pat. No. 5,379,427 issued to Belo on Jan. 3, 1995 and entitled "Hardware process scheduler and processor interrupter for parallel processing computer systems"; U.S. Pat. No. 5,390,301 issued to Scherf on Feb. 14, 1995 and entitled "Method and apparatus for communicating device-specific information between a device driver and an operating system in a computer system"; U.S. Pat. No. 5,398,333 issued to Schieve et al. on Mar. 14, 1995 and entitled "Personal computer employing reset button to enter ROM-based diagnostics"; U.S. Pat. No. 5,404,544 issued to Crayford on Apr. 4, 1995 and entitled "System for periodically transmitting signal to/from sleeping node identifying its existence to a network and awakening the sleeping node responding to received instruction"; U.S. Pat. No. 5,416,480 issued to Roach et al. on May 16, 1995 and entitled "Analog interface circuits for process controllers and process monitors"; "U.S. Pat. No. 5,418,942 issued to Krawchuk et al. on May 23, 1995 and entitled "System and method for storing and managing information"; U.S. Pat. No. 5,428,790 issued to Harper et al. on Jun. 27, 1995 and entitled "Computer power management system"; U.S. Pat. No. 5,479,355 issued to Hyduke on Dec. 26, 1995 and entitled "System and method for a closed loop operation of schematic designs with electrical hardware", U.S. Pat. No. 5,481,730 issued to Brown et al. on Jan. 2, 1996 and entitled "Monitoring and control of power supply functions using a microcontroller"; U.S. Pat. No. 5,805,094 issued to Roach et al. on Sep. 8, 1998 and entitled "Analog interface circuits for process controllers and process monitors"; U.S. Pat. No. 5,881,227 issued to Atkinson et al. on Mar. 9, 1999 and entitled "Efficient message processing using a multi-ported RAM and a dedicated microcontroller"; and U.S. Pat. No. 6,072,462 issued to Moshovich on Jun. 6, 2000 and entitled "Technique for generating on-screen display characters using software implementation", all of these U.S. patents being hereby expressly incorporated by reference as if set forth in their entirety herein.

Some examples of stepping motors, also referred to as stepper motors herein above, which may possibly be incorporated in an embodiment of the present invention are to be found in: U.S. Pat. No. 5,905,353 issued to Hiramoto et al. on May 18, 1999 and entitled "Method and apparatus of driving stepping motor"; U.S. Pat. No. 5,945,750 issued to Sauter et al. on Aug. 31, 1999 and entitled "Stepping motor"; U.S. Pat. No. 5,945,759 issued to Tanaka et al. on Aug. 31, 1999 and entitled "Stepping motor"; U.S. Pat. No. 5,990,651 issued to Iwazawa et al. on Nov. 23, 1999 and entitled "Stepping motor drive apparatus and stepping motor"; U.S. Pat. No. 6,100,612 issued to Satoh on Aug. 8, 2000 and entitled "Stepping motor"; U.S. Pat. No. 6,114,826 issued to Nishiura et al. on Sep. 5, 2000 and entitled "Stepping motor driving apparatus having small time constant regenerative current path"; U.S. Pat. No. 6,137,252 issued to Kojima et al. on Oct. 24, 2000 and entitled "Controller of a stepping motor, control method for the motor and timing device"; U.S. Pat. No. 6,144,120 issued to Doi et al. on Nov. 7, 2000 and entitled "Stepping motor for stable control of position of driven body"; U.S. Pat. No. 6,153,953 issued to Isozaki et al. on Nov. 28, 2000 and entitled "Multi-phase PM-type stepping motor"; and U.S. Pat. No. 6,160,330 issued to Sakamoto on Dec. 12, 2000 and entitled "Three-phase stepping motor and driving method therefor", all of these U.S. patents being hereby expressly incorporated by reference as if set forth in their entirety herein.

Some examples of limit switches which may possibly be incorporated in an embodiment of the invention may be found in: U.S. Pat. No. 4,063,056 issued to Baker on Dec. 13, 1977 and entitled "Bi-directional limit switch"; U.S. Pat. No. 4,223,256 issued to Espenschied on Sep. 16, 1980 and entitled "Limit switch for D-C positioning motor"; U.S. Pat. No. 4,330,052 issued to Schymick on May 18, 1982 and entitled "Combined stop and limit switch"; U.S. Pat. No. 4,413,549 issued to Knable on Nov. 8, 1983 and entitled "Limit switch actuator for fluid cylinders"; U.S. Pat. No. 4,885,437 issued to Tenniswood et al. on Dec. 5, 1989 and entitled "Rotating cam limit switch"; U.S. Pat. No. 4,896,536 issued to Benz on Jan. 30, 1990 and entitled "oscillation unit for filling level vibration limit switch"; U.S. Pat. No. 4,943,715 issued to Konishi on Jul. 24, 1990 and entitled "Limit switch having means to evaluate its actuating stroke"; U.S. Pat. No. 4,960,966 issued to Evans et al. on Oct. 2, 1990 and entitled "Limit switch"; U.S. Pat. No. 5,207,316 issued to Sakamoto on May 4, 1993 and entitled "Limit switch"; U.S. Pat. No. 5,227,965 issued to Klaes et al. on Jul. 13, 1993 and entitled "Fast programmable limit switch"; U.S. Pat. No. 5,298,700 issued to Champagne et al. on Mar. 29, 1994 and entitled "Limit switch module and cam for use in the same"; U.S. Pat. No. 5,552,570 issued to Shinohara et al. and entitled "Limit switch"; U.S. Pat. No. 5,756,876 issued to Wetzel et al. on May 26, 1998 and entitled "Method of setting the switching point of a capacitive level limit switch"; and U.S. Pat. No. 5,965,960 issued to Cowan et al. on Oct. 12, 1999 and entitled "Electronic limit switch system", all of these U.S. patents being hereby expressly incorporated by reference as if set forth in their entirety herein.

Some examples of rack and pinion drive arrangements which may possibly be incorporated in an embodiment of the present invention may be found in: U.S. Pat. No. 4,147,067 issued to Staat on Apr. 3, 1979 and entitled "Linear drive"; U.S. Pat. No. 4,424,722 issued to Jackson et al. on Jan. 10, 1984 and entitled "Rack and pinion drive arrangement"; U.S. Pat. No. 4,463,683 issued to Uttscheid on Aug. 7, 1984 and entitled "Rack and pinion drive trolley with slip-ring drive wheel"; U.S. Pat. No. 4,515,065 issued to Hannmann, Jr. et al. on May 7, 1985 and entitled "Automatic centering servo actuator"; U.S. Pat. No. 4,550,626 issued to Brouwer on Nov. 5, 1985 and entitled "Servomotor assembly for machine slides"; U.S. Pat. No. 4,551,072 issued to Barall on Nov. 5, 1985 and entitled "Fluid pressure operated actuator"; U.S. Pat. No. 5,161,424 issued to Saberton et al. on Nov. 10, 1992 and entitled "Anti-backlash drive system"; and U.S. Pat. No. 5,408,407 issued to Lefkowitz et al. on Apr. 18, 1995 and entitled "System and method for positioning a work point", all of these U.S. patents being hereby expressly incorporated by reference as if set forth in their entirety herein.

Some examples of spindle drive apparatus which possibly may be incorporated in an embodiment of the present invention may be found in: U.S. Pat. No. 3,972,535 issued to Bleiman on Aug. 3, 1976 and entitled "Spindle drive motor"; U.S. Pat. No. 4,164,113 issued to Thompson on Aug. 14, 1979 and entitled "Spindle drive adapter"; U.S. Pat. No. 4,197,489 issued to Dunn et al. on Apr. 8, 1980 and entitled "Spindle drive system"; U.S. Pat. No. 4,274,297 issued to Blurock et al. on Jun. 23, 1981 and entitled "Spindle drive mechanism with circulating balls"; U.S. Pat. No. 4,449,866 issued to Lohneis et al. on May 22, 1984 and entitled "Servo-controlled spindle drive system"; U.S. Pat. No. 4,474,073 issued to Blaurock et al. on Oct. 2, 1984 and entitled "Spindle drive assembly with recirculating balls"; U.S. Pat. No. 4,578,625 issued to Nazarian et al. on Mar. 25, 1986 and entitled "Spindle drive control system"; U.S. Pat. No. 5,024,115 issued to Hahn et al. on Jun. 18, 1991 and entitled "Spindle drive"; U.S. Pat. No. 5,067,363 issued to Hafla on Nov. 26, 1991 and entitled "Clearance-free spindle drive"; U.S. Pat. No. 5,099,781 issued to Frank on Mar. 31, 1992 and entitled "Fluid resistant spindle drive motor"; U.S. Pat. No. 5,848,554 issued to Kober et al. on Dec. 15, 1998 and entitled "Multistage spindle drive for converting rotary motion into linear motion"; and U.S. Pat. No. 6,053,065 issued to Melzer et al. on Apr. 25, 2000 and entitled "Spindle drive", all of these U.S. patents being hereby expressly incorporated by reference as if set forth in their entirety herein.

Some examples of pneumatic drive apparatus which may possibly be incorporated in an embodiment of the present invention may be found in: U.S. Pat. No. 4,300,351 issued to Grüllmeier on Nov. 17, 1981 and entitled "Boosted Hydro-pneumatic drive"; U.S. Pat. No. 4,452,126 issued to Tomov on Jun. 5, 1984 and entitled "Pneumatic drive"; U.S. Pat. No. 4,563,939 issued to Siegrist on Jan. 14, 1986 and entitled "Hydrostatic or pneumatic drive and method of operating same"; U.S. Pat. No. 4,794,841 issued to Kemmler et al. on Jan. 3, 1989 and entitled "Pneumatic drive mechanism for positioning apparatus"; U.S. Pat. No. 4,819,541 issued to Pitsch et al. on Apr. 11, 1989 and entitled "Control of a double-action pneumatic drive"; U.S. Pat. No. 4,841,845 issued to Beullens on Jun. 27, 1989 and entitled "Hydraulic or pneumatic drive device"; U.S. Pat. No. 5,432,653 issued to Moore et al. on Jul. 11, 1995 and entitled "Looped-shaped pneumatic drive"; and U.S. Pat. No. 5,676,033 issued to Szabo on Oct. 14, 1997 and entitled "Pneumatic drive device", all of these U.S. patents being hereby expressly incorporated by reference as if set forth in their entirety herein.

Some examples of hydraulic drive apparatus which may possibly be incorporated in an embodiment of the present invention may be found in: U.S. Pat. No. 5,168,705 issued to Hirata et al. on Dec. 8, 1992 and entitled "Hydraulic drive system"; U.S. Pat. No. 5,421,156 issued to Beater et al. on Jun. 6, 1995 and entitled "Hydraulic drive system"; U.S. Pat. No. 5,622,095 issued to Foster on Apr. 22, 1997 and entitled "Hydraulic drive and control system"; U.S. Pat. No. 5,638,678 issued to Försterling on Jun. 17, 1997 and entitled "Hydraulic drive system"; U.S. Pat. No. 5,657,681 issued to Henricson on Aug. 19, 1997 and entitled "Hydraulic drive system"; U.S. Pat. No. 5,680,760 issued to Lunzman on Oct. 28, 1997 and entitled "Hydraulic drive system,"; U.S. Pat. No. 5,829,336 issued to Schulze on Nov. 3, 1998 and entitled "Hydraulic drive unit"; U.S. Pat. No. 5,873,245 issued to Kato et al. on Feb. 23, 1999 and entitled "Hydraulic drive system"; U.S. Pat. No. 5,875,630 issued to Walsh et al. on Mar. 2, 1999 and entitled "Hydraulic drive assembly"; U.S. Pat. No. 6,059,534 issued to Kotake et al. on May 9, 2000 and entitled "Control system for hydraulic drive"; U.S. Pat. No. 6,105,367 issued to Tsuruga et al. on Aug. 23, 2000 and entitled "Hydraulic drive system"; U.S. Pat. No. 6,152,709 issued to Mentink on Nov. 28, 2000 and entitled "Hydraulic drive cylinder"; and U.S. Pat. No. 6,167,085 B1 issued to Kirakos-Shirvanyan on Jan. 23, 2001 and entitled "Hydraulic drive system", all of these U.S. patents being hereby expressly incorporated by reference as if set forth in their entirety herein.

Some examples of linear drive apparatus which may possibly be incorporated in an embodiment of the present invention may be found in: U.S. Pat. No. 4,656,881 issued to Goedecke et al. on Apr. 14, 1987 and entitled "Linear drive"; U.S. Pat. No. 5,228,380 issued to Stoll et al. on Jul. 20, 1993 and entitled "Linear drive"; U.S. Pat. No. 5,330,272 issued to Stoll on Jul. 19, 1994 and entitled "Linear drive"; U.S. Pat. No. 5,351,599 issued to Stoll on Oct. 4, 1994 and entitled "Linear drive device"; U.S. Pat. No. 5,467,686 issued to Lipinski on Nov. 21, 1995 and entitled "Linear drive without a piston rod"; U.S. Pat. No. 5,469,775 issued to Stoll et al. on Nov. 28, 1995 and entitled "Linear drive with a buffer device"; U.S. Pat. No. 5,551,314 issued to Andrzejewski, Jr. et al. on Sep. 3, 1996 and entitled "Lead screw and linear drive assemblies using such lead screw"; U.S. Pat. No. 5,568,982 issued to Stoll et al. on Oct. 29, 1996 and entitled "Linear drive"; U.S. Pat. No. 5,662,022 issued to Stoll on Sep. 2, 1997 and entitled "Piston-rod-less linear drive"; U.S. Pat. No. 5,808,379 issued to Zhao on Sep. 15, 1998 and entitled "Bi-directional linear drive motor"; U.S. Pat. No. 5,819,584 issued to Evans on Oct. 13, 1998 and entitled "Linear drive system"; U.S. Pat. No. 5,949,161 issued to Nanba on Sep. 7, 1999 and entitled "Linear drive device"; U.S. Pat. No. 6,008,552 issued to Yagoto et al. on Dec. 28, 1999 and entitled "Linear drive device"; and U.S. Pat. No. 6,177,743 B1 issued to Hartramph et al. on Jan. 23, 2001 and entitled "Linear drive", all of these U.S. patents being hereby expressly incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Some examples of belt drives which may possibly be incorporated in an embodiment of the present invention may be found in: U.S. Pat. No. 5,415,592 issued to Hoyt on May 16, 1995 and entitled "Auxiliary belt drive mechanism"; U.S. Pat. No. 5,486,143 issued to Ashby on Jan. 23, 1996 and entitled "Belt drive transmission"; U.S. Pat. No. 5,516,333 issued to Benson on May 14, 1996 and entitled "Torque responsive actuation device for a belt drive system"; U.S. Pat. No. 5,728,019 issued to Becker et al. on Mar. 17, 1998 and entitled "Belt drive"; U.S. Pat. No. 5,749,800 issued to Nagel et al. on May 12, 1998 and entitled "Synchronous belt drive"; U.S. Pat. No. 5,984,819 issued to McComber on Nov. 16, 1999 and entitled "Belt drive differential"; U.S. Pat. No. 6,004,236 issued to Suzuki on Dec. 21, 1999 and entitled "Belt-drive mechanism"; U.S. Pat. No. 6,019,692 issued to Kojima et al. on Feb. 1, 2000 and entitled "Belt drive device for reducing belt load"; U.S. Pat. No. 6,050,913 issued to Reuschenbach et al. on Apr. 18, 2000 and entitled "System for adjusting the tension of the belt drive of a belt transmission"; U.S. Pat. No. 6,113,509 issued to Downing on Sep. 5, 2000 and entitled "Differential planetary belt drive system"; and U.S. Pat. No. 6,142,901 issued to Kölling on Nov. 7, 2000 and entitled "Belt drive", all of these U.S. patents being hereby expressly incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, which were cited in the Preliminary Examination Report in connection with the PCT application, dated Oct. 6, 2000, and/or cited elsewhere are hereby incorporated by reference as if set forth in their entirety herein as follows:

U.S. Pat. No. 4,810,385 issued to Hater et al. on Mar. 7, 1989 and entitled "Device for seeding bacterial cultures to systems to assist in biodegrading waste"; DE-A-39 06 124 A1 published on Aug. 30, 1990, and having inventor Wixforth; WO-A97/07190 published on Feb. 27, 1997, and having inventor Rouillard; EP-A-0 546,881 published on Jun. 16, 1993, and having inventors Bald et al.; U.S. Pat. No. 5,284,587 issued to Wong et al. on Feb. 8, 1994 and entitled "Bacteria-containing polymer gel for waste water treatment"; U.S. Pat. No. 5,171,687 issued to Moller et al. on Dec. 15, 1992 and entitled "Apparatus for culturing and delivery of microbe for waste treatment in a flow system".

The following patent applications, or patent publications, are hereby incorporated by reference as if set forth in their entirety herein as follows: European patent application 0 185 528 published on Jun. 25, 1986, having inventors Swann et al. and entitled "Enzymatic drain cleaning compositions"; European patent application 0 178 931 published on Apr. 23, 1986, having inventors Swann et al. and entitled "Composition for cleaning drains".

The corresponding foreign and international patent publication applications, namely, Federal Republic of Germany Patent Application No. DE 198 38 202.2, filed on Aug. 24, 1998 and Federal Republic of Germany Patent Application No. 198 58 189.0 filed on Dec. 17, 1998, having inventors Hans-Eberhard LORENZ, Albrecht LANG, Manuel L ÜLING, and Heiner OPHARDT and International Application No. PCT/EP99/06126, filed on Aug. 20, 1999, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

This invention as described hereinabove in the context of the preferred embodiments is not to be taken as limited to all of the provided details thereof, since modifications and variations thereof may be made without departing from the spirit and scope of the invention.

What is claimed is:

1. An apparatus for cleaning waste water pipes and/or grease traps containing fatty residues and/or grease, said apparatus comprising:

apparatus configured to provide a dry agent comprising bacteria and enzymes;

apparatus configured to mix said dry agent comprising bacteria and enzymes with an amount of water sufficient to cause in-situ production of an aqueous mixture;

an activator vessel structure configured to maintain said aqueous mixture to activate said aqueous mixture for a time sufficient to form an aqueous solvent for cleaning fatty residues and/or grease;

apparatus configured to contact said waste water pipes and/or grease traps containing fatty residues and/or grease with said aqueous solvent for dissolving said fatty residues and/or grease; and thus clean said waste water pipes and/or grease traps by biodigesting fatty residues and/or grease deposited in said waste water pipes and/or grease traps;

a data processor device operatively connected at least to said activator vessel structure;

said data processor device being configured to provide process control;

apparatus configured to measure the filling times to fill said activator vessel structure to supply said data processor device with data for process control by said data processor device;

apparatus configured to measure the activation period of time of said aqueous mixture in said activator vessel structure for process control by said data processor device;

apparatus configured to determine a value of the quantity of fatty residue present in waste water for process control by said data processor device;

said data processor device comprising a RAM programmed control apparatus for consideration of days of operation and rest;

a storage container being configured to store dry agent;

said storage container being operatively connected to said activator vessel structure;

a dosage apparatus being disposed beneath said storage container;

said dosage apparatus being configured to perform one of: linearly operating mode and circularly operating mode; and said dosage apparatus being configured to supply a predetermined quantity of said dry agent to said activator vessel structure.

2. The apparatus according to claim 1 wherein said dosage apparatus comprises a linear feeder.

3. A method for clearing waste water pipes and/or grease traps containing grease, said method comprising the steps of:

operating a dosage apparatus to provide a dry concentrate comprising bacteria and enzymes to an activator vessel structure, wherein said dosage apparatus comprises one of:

a circularly operating dosage apparatus comprising one of: a dosage drum having at least one recess or pocket for receiving dry concentrate and a cell wheel; and a linearly operating dosage apparatus comprising one of: a dosage scale and a linear feeder apparatus;

mixing said dry concentrate in said activator vessel structure with an amount of water sufficient to cause in-situ production of an aqueous mixture;

maintaining said aqueous mixture in said activator vessel structure at a predetermined temperature to activate said aqueous mixture for a time sufficient to form an aqueous solvent for clearing grease;

adding a predetermined amount of aqueous solvent in portions to said waste water pipes;

passing said aqueous solvent to said waste water pipes and/or said grease traps;

contacting said waste water pipes and/or grease traps containing grease with said aqueous solvent;

said step of operating said circularly-operating dosage apparatus comprising the steps of:

controlling the speed of rotation of said dosage drum for loading and unloading said dry concentrate;

driving said dosage drums or said cell wheels with a stepping motor; and one of:

maintaining said dosage drum in an unloading position upon unloading of dry concentrate into said activator vessel structure until a succeeding dosage cycle; and moving said dosage drum immediately upon unloading dry concentrate into said activator vessel structure until said at least one recess or pocket is closed with respect to said activator vessel structure; and said step of operating said linearly-operating dosage apparatus comprising one of the steps of:

moving said linear feeder apparatus immediately upon unloading to close its filling opening; and returning said linear feeder apparatus immediately upon unloading to its filling position when this is of benefit for said dry concentrate.

4. The method according to claim 3 further comprising the step of:

cleaning said activator vessel structure upon emptying of said activator vessel structure.

5. The method according to claim 4 further comprising the steps of:

measuring the filling times to fill said activator vessel structure to supply a data processor device with data for process control;

measuring the activation period of time of said aqueous mixture for process control; and removing unmixed concentrate and/or deposits through agitation of said aqueous mixture in said activator vessel structure.

6. The method according to claim 5 wherein said dry concentrate comprises an anti-blocking agent comprising one of: pumice and chalk, said method further comprises the steps of:

passing aqueous solvent to said waste water pipes on a daily basis on working days and to the exclusion of holidays;

using a data processor device comprising a RAM programmed control apparatus for consideration of days of rest;

metering with said dosage apparatus a predetermined quantity of said dry concentrate to said activator vessel structure; said activator vessel structure being disposed beneath said dosage apparatus; with said metering step of a predetermined quantity of said dry concentrate being carried out in one or several steps to supply said dry concentrate into said activator vessel for said mixing step of mixing said dry concentrate with water or dissolution thereof in water;

returning said dosage drum immediately upon unloading to its filling position when this is of benefit for said dry concentrate; and using a circuit control in operation of said dosage apparatus, said circuit control being selected from the group comprising: limit switches for step control, electronic controls, revolution counters, angle of displacement measuring devices, impulse controlled motors, and combinations thereof; and said step of contacting said waste water pipes and/or grease traps containing grease with said aqueous solvent further comprises one of (A), (B), and (C):

(A) adjusting said contacting step as a function of data indicative of the content of fatty residues in a stream of waste water or independently of the quantity of flowing-through of waste water;

(B) passing a determined value of quantity of fatty residue to a data processor device for controlling said contacting step based on a determined value of quantity of fatty residues; and controlling said contacting step with said data processor device in conformity with the value of quantity of fatty residues by one of: addition of aqueous solvent based on experience and based on empirically determined data; and (C) controlling said contacting step through use of a timer apparatus and/or a control apparatus connected to pertaining device components, said timer apparatus comprises apparatus capable of performing a plurality of cycle intervals for one or several functions of producing said aqueous mixture and said aqueous solvent.

7. A method of cleaning waste water pipes and/or grease traps containing fatty residues and/or grease, said method comprising the steps of:

providing a dry agent comprising: bacteria and enzymes;

mixing said dry agent comprising bacteria and enzymes with an amount of water sufficient to cause in-situ production of an aqueous mixture;

maintaining said aqueous mixture in an activator vessel structure to activate said aqueous mixture for a time sufficient to form an aqueous solvent for cleaning fatty residues and/or grease;

contacting said waste water pipes and/or grease traps containing fatty residues and/or grease with said aqueous solvent for dissolving said fatty residues and/or grease; and thus cleaning said waste water pipes and/or grease traps by biodigesting fatty residues and/or grease deposited in said waste water pipes and/or grease traps; and cleaning said activator vessel structure with water upon passing said aqueous solvent to a waste water pipe or to a grease trap.

8. The method according to claim 7 further comprising the steps of:

circulating said dry agent in said activator vessel structure;

maintaining in said activator vessel structure a temperature sufficient to cause growth of said bacteria and/or said enzymes in said aqueous mixture; and adding air into said activator vessel structure to provide growth of said bacteria and/or of said enzymes in said aqueous mixture.

9. The method according to claim 8 further comprising the step of:

agglomerating said dry agent to provide a pulverous concentrate comprising concentrate pellets and/or concentrate grains prior to mixing said dry agent with said water in said mixing step.

10. The method according to claim 9 further comprising the step of freeze-drying said dry agent.

11. The method according to claim 10 which includes the step of production of said dry agent by rapid freeze drying.

12. The method according to claim 10 further comprising at least one of:

comminuting said freeze-dried agent by grinding;

pelletizing said freeze-dried agent to produce freeze-dried pellets; and pelletizing said dry agent to produce dry agent pellets.

13. The method according to claim 12 wherein at least one of said pelletizing steps comprises pelletizing starting material of said bacteria and said enzymes between rolls or compacting starting material of said bacteria and said enzymes by pressing it through forming nozzles to produce strands of said starting material, further comprising the step of granulating strands of said starting material.

14. The method according to claim 12 further comprising the steps of:
classifying said dry agent ground in accordance with said step of comminuting said freeze-dried agent by grinding and/or the granulate produced in accordance with said step of granulating strands of said starting material; and
separating undersize and/or oversize dry agent particles.

15. The method according to claim 14 wherein dry agent is introduced into said activator vessel prior to addition of water to said activator vessel structure and/or the resultant aqueous solvent is added at latest at the grease trap or at a comparable location in said waste water pipes.

16. The method according to claim 15 and comprising the step of:

adjusting the content of said dry agent in said aqueous mixture to an amount selected from the range of from about 4 grams of said dry agent per liter of water to about 100 grams of said dry agent per liter of water.

17. The method according to claim 16 wherein said step of maintaining said aqueous mixture in said activator vessel structure comprises maintaining said aqueous mixture in said activator vessel structure for at least 0.5 hours.

18. The method according to claim 16 and including at least one of (a36) through (y36):

(a36) adding a predetermined amount of aqueous solvent in portions to said waste water pipes;

(b36) passing said aqueous solvent to said waste water pipes and/or said grease traps;

(c36) said step of providing a dry concentrate comprising operating a dosage apparatus, wherein said dosage apparatus comprises one of:

a circularly operating dosage apparatus comprising one of:

a cell wheel; and a dosage drum having at least one recess or pocket for receiving dry concentrate, said at least one recess or pocket comprising at least one unloading surface;

said dosage drum comprising a dosage drum which rotates clockwise and/or counterclockwise and/or a speed-controlled dosage drum;

said dosage drum having a drum housing having a continuous shaft opening running through it and said dosage drum being arranged within said drum housing so that it can rotate within said housing;

said dosage drum being connected to a drive motor via a transmission;

a key-slot connection between said dosage drum and said transmission and/or the use of a transmission that simultaneously forms a controller for said dosage drum; said transmission comprising a toothed wheel and a pinion on the drive shaft of said drive motor or said transmission being designed as a cam controller;

said dosage drum is configured to be rotated upon unloading said dry agent for closing of its opening until said at least one recess is brought to the position in which said at least one recess is transverse to a line which passes through a center of an outlet opening of said storage container and a center of an inlet opening of said activator vessel structure;

said dosage drum or said cell wheel have recesses or pockets with a capacity which is less than a predetermined quantity of volume of dry agent for a production cycle; and a linearly operating dosage apparatus comprising one of: a dosage scale and a linear feeder apparatus;

said linear feeder comprising a cylinder with a reciprocating piston rod and two pistons mounted on the piston rod spaced apart from one another, and wherein said cylinder is connected to said storage container and said two pistons drive into said storage container when it moves backwards and forwards so that dry agent penetrates between said two pistons and is drawn out of said cylinder on the next stroke of said piston;

said linear feeder being arranged vertically beneath said storage container;

said two pistons comprise two sealing discs;

said linear feeder having a lower, considered in the vertical direction, piston; said piston having an outlet slope;

said piston rod, together with said two pistons comprises a plastic injection-molded part;

said linear feeder comprising a lower piston, which is constructed as a membrane seal and/or is mushroom-shaped, or hat-shaped, or cone-shaped;

said pistons comprising plastic pistons with molded sealing lips;

said linear feeder comprising one of:

multiple seals on one piston and/or the use of pistons on the storage container side with the same configuration as the lower piston but mounted displaced by 180 degrees;

a cylinder molded onto said storage container or the use of a storage container with a cylindrical outlet opening matched to said piston rod and said two pistons;

a piston rod connected to one of: a belt drive, a chain drive, and a linear motor drive, a reciprocating cylinder drive, a spindle drive, and a toothed rack and pinion drive;

toothed belts or V-belts in at least said belt drive;

a plurality of pistons wherein the piston nearest said storage container is provided with an O-ring and the other piston is provided with a sealing lip;

(d36) said step of operating said circularly-operating dosage apparatus comprising the steps of:

rotating said dosage drum for unloading dry agent into said activator vessel structure until said unloading surface is in an inclined attitude sufficient for unloading said dry agent;

controlling the speed of rotation of said dosage drum for loading and unloading said dry concentrate;

driving said dosage drums or said cell wheels with a stepping motor;

one of:

maintaining said dosage drum in an unloading position upon unloading of dry concentrate into said activator vessel structure until a succeeding dosage cycle; and moving said dosage drum immediately upon unloading dry concentrate into said activator vessel structure until said at least one recess or pocket is closed with respect to said activator vessel structure; and returning said dosage drum immediately upon unloading to its filling position when this is of benefit for said dry concentrate;

rotating said dosage drum for filling until said recess for the pertaining filling position provides an inclined inlet surface;

maintaining said inclined inlet surface or the pertaining outlet surface in an inclined and arrested position by stopping rotation of said dosage drum;

controlling the speed of rotation of said dosage drum for loading and unloading said dry agent;

use of the same dosage drums or cell wheels for differing amounts of said dry agent;

varying the dosage movements for adaptation to differing amounts of dry agent;

driving said dosage drums or said cell wheels with a stepping motor;

(e36) said step of operating said linearly-operating dosage apparatus comprising one of the steps of:

bringing said piston rod into a position in which both said two pistons are within a pertaining cylinder portion in order to seal said storage container;

moving said linear feeder apparatus immediately upon unloading to close its filling opening; and returning said linear feeder apparatus immediately upon unloading to its filling position when this is of benefit for said dry concentrate;

(e36) passing aqueous solvent to said waste water pipes on a daily basis on working days and to the exclusion of holidays;

(f36) using a data processor device comprising a RAM programmed control apparatus for consideration of days of rest;

(g36) metering with said dosage apparatus a predetermined quantity of said dry concentrate to said activator vessel structure; said activator vessel structure being disposed beneath said dosage apparatus; with said metering step of a predetermined quantity of said dry concentrate being carried out in one or several steps to supply said dry concentrate into said activator vessel for said mixing step of mixing said dry concentrate with water or dissolution thereof in water;

(h36) using a circuit control in operation of said dosage apparatus, said circuit control being selected from the group comprising: limit switches for step control, electronic controls, revolution counters, angle of displacement measuring devices, impulse controlled motors, and combinations thereof; and (i36) said step of contacting said waste water pipes and/or grease traps containing grease with said aqueous solvent further comprises one of:

adjusting said contacting step as a function of data indicative of the content of fatty residues in a stream of waste water or independently of the quantity of flowing-through of waste water;

passing a determined value of quantity of fatty residue to a data processor device for controlling said contacting step based on a determined value of quantity of fatty residues; and controlling said contacting step with said data processor device in conformity with the value of quantity of fatty residues by one of: addition of aqueous solvent based on experience and based on empirically determined data; and controlling said contacting step through use of a timer apparatus and/or a control apparatus connected to pertaining device components, said timer apparatus comprises apparatus capable of performing a plurality of cycle intervals for one or several functions of producing said aqueous mixture and said aqueous solvent;

(j36) using a seal on one of: said dosage drum and said linear feeder, said seal comprising one of:

a rubber seal when using pellets of dry agent and/or a seal made from a thermoplastic material when using powder of dry agent;

a seal arranged on the outlet side of said dosage drum in a gap between said dosage drum and its surrounding housing;

a composite seal or a one-piece seal;

a molded part as a seal and/or of O-rings and straight sealing lips lying between said O-rings;

(k36) using an attached flask or bottle as said storage container and wherein the neck of said flask forms said cylinder;

(l36) using a guide piece and/or inlet piece positioned before said cylinder;

(m36) using one or more water nozzles in said activator vessel structure for pre-coating and/or mixing and/or cleaning, said nozzles being disposed at one of: the base of said activator vessel structure, at the upper rim of said activator vessel structure, in a pertaining lid of said activator vessel structure, in the wall of said activator vessel structure, and in said activator vessel structure;

(n36) said step of mixing water and dry agent comprises one of:

adding water and dry agent alternately;

mixing water and dry agent between pertaining feed intervals;

first feeding dry agent into said activator vessel structure;

(o36) actuating said water nozzles in or at the base of said activator vessel structure;

(p36) feeding water into said activator vessel structure up to a preliminary filling level;

(q36) after the time of activation of said dry agent has expired, effecting a further movement of the aqueous mixture or aqueous solvent in said activator vessel structure by actuating said water nozzles for further movement of the aqueous mixture and for mixing, wherein the quantity of water used for moving the aqueous mixture and for mixing is at the same time used totally or in part for activating said enzymes and said bacteria or in that water is drawn off at the same time from another point;

(r36) actuating said water nozzles for cleaning said activator vessel structure, wherein said nozzles are mounted at an angle and/or tangentially and are directed against the activator vessel structure wall and/or into the pertaining outlet;

(s36) supplying water continuously or intermittently to said nozzles;

(t36) controlling water supply in said activator vessel structure with a level switch and/or a timer switch, wherein said level switch comprises a float switch or a capacitive switch arranged on the outside of said activator vessel structure, and said activator vessel structure comprises:

an overflow or a plug closure;

a sieve before the outlet/exit opening of said activator vessel structure when pellets and/or agent granules are used;

a hollow plug at said outlet of said activator vessel structure, said hollow plug having an open, tubular, upward-protruding end, for acting as an overflow, and to determines the maximum filling level in said activator vessel structure;

a cone-shaped cover for said overflow in said activator vessel structure;

an activator vessel structure in which the outlet thereof is not arranged exactly vertically beneath the dry agent feed;

a revolving or stationary baffle surface for the distribution of dry agent;

(u36) effecting a vertical movement of the bath comprising said aqueous mixture with a pumping mechanism, said pumping mechanism comprising:

at least one of: horizontally rotating pump rotors, pump impellers, and pump wheels, wherein said pump rotors, pump impellers, and pump wheels are disposed on the base of said activator vessel structure and are matched to the base of said activator vessel structure;

said pump rotors, pump impellers, pump wheels are disposed such that their height above the base of said activator vessel structure to the height of said activator vessel structure is at least 1:30 and at most 1:3;

said pump rotors, said pump impellers, said pump wheels have a height from about 10 to about 30 millimeters;

two of: pump rotors, pump impellers, and pump wheels, disposed one above the other, of which the upper is intended for circulation or mixing and the lower for pumping out;

one of: a shaft, and an axle, on which are disposed the selected one of: pump rotors, pump impellers, and pump wheels, and wherein each pump rotor, pump impeller, and pump wheel effects a flow in a different direction of rotation and runs freely with the other when rotating in the non-flow direction;

said pump rotors, pump impellers, and pump wheels, having bent vanes, wherein the vanes of one pump rotor, pump impeller, and pump wheel are bent in the opposite circumferential direction to the other pump rotor, pump impeller, and pump wheel;

said vanes having a bending radius that is at least equal to ¼ of the diameter of the pump rotor, pump impeller, and pump wheel and at most equal to ½ of the diameter of the selected pump rotor, pump impeller, and pump wheel;

said pump rotors, pump impellers, and pump wheels are equipped with at least one ring-shaped disc at the top;

said ring-shaped discs leave an opening free in the center and/or form a seal with the edge of the pertaining pump rotor, pump impeller, and pump wheel and/or form channels;

two pump mechanisms are disposed one above the other in said activator vessel structure, of which the lower is intended for emptying and the upper for circulation or mixing;

said activator vessel structure encircles the lower pump mechanism with a ring-shaped channel for collecting the pertaining liquid;

at least one pump whose pertaining central opening and/or the channel at least in the area of the pertaining suction opening is equipped with a filter cover;

said activator vessel structure encircles the two pump mechanisms with a web, which ends at said ring-shaped disc of the lower pump mechanism;

a plurality of pump mechanisms, of which one pump mechanism is equipped with a tube and the other pump mechanism sits on said tube;

air is introduced into said aqueous mixture through said tube;

(v36) deflecting horizontal flow of aqueous mixture into a vertical flow with flow-guiding inserts and/or profiles in said activator vessel structure, wherein said activator vessel structure comprises:

ribs extending vertically on the inside of said activator vessel structure by a distance, or height, that is at least 10% and/or a maximum of 50% of the radius of said activator vessel structure;

said ribs terminate at a distance from the upper rim of said activator vessel structure;

said ribs have a distance of length from the upper rim of said activator vessel structure which is at least equal to ¼ of the diameter of said activator vessel structure;

said ribs have a length which at maximum is equal to ¾ of the diameter of said activator vessel structure and/or which start from the base of said activator structure;

said activator vessel structure has a constant diameter and which is matching the height of said activator vessel structure or the length of said activator vessel structure to a desired activator vessel structure volume and/or activator vessel structure length, which at maximum is equal to ¾ times the activator vessel structure diameter;

said activator vessel structure has a diameter between about 100 and about 300 millimeters;

an air pipe leading into a negative-pressure zone of the pump mechanism for the circulation;

said activator vessel structure is an angled arrangement of said activator vessel structure;

at least one component being made of bacteria-resistant and enzyme-resistant materials;

at least one component made of at least one of: sprayed Teflon, polyethylene (PE), polypropylene (PP), polyoxymethylene (POM), and stainless steel; and and comprising when at least one of: activator vessel structure, device assembly, and supply duct, is arranged before a siphon when viewed in the direction of waste water flow, the siphon is rinsed through at least once when or after said aqueous solvent is run off;

(w36) pumping out said aqueous solvent after the desired growth of said enzymes and said bacteria is reached, wherein that pump is also used for the vertical movement of the bath;

(x36) one of:

maintaining the pump speed at one of:

less than 1500 rpm at least during the pertaining circulation process;

less than 500 rpm; and between 100 and 300 rpm;

increasing said pump speed when pumping out; and (y36) air provided for activating said enzymes and said bacteria is sucked in by the same pump mechanism as is used for the circulation or mixing and/or is measured in by a separate pump.

19. The method according to claim 16 and including all of (a37) through (y37):

(a37) adding a predetermined amount of aqueous solvent in portions to said waste water pipes;

(b37) passing said aqueous solvent to said waste water pipes and/or said grease traps;
(c37) said step of providing a dry concentrate comprising operating a dosage apparatus, wherein said dosage apparatus comprises one of:
a circularly operating dosage apparatus comprising one of:
a cell wheel; and
a dosage drum having at least one recess or pocket for receiving dry concentrate, said at least one recess or pocket comprising at least one unloading surface;
said dosage drum comprising a dosage drum which rotates clockwise and/or counterclockwise and/or a speed-controlled dosage drum;
said dosage drum having a drum housing having a continuous shaft opening running through it and said dosage drum being arranged within said drum housing so that it can rotate within said housing;
said dosage drum being connected to a drive motor via a transmission;
a key-slot connection between said dosage drum and said transmission and/or the use of a transmission that simultaneously forms a controller for said dosage drum;
said transmission comprising a toothed wheel and a pinion on the drive shaft of said drive motor or said transmission being designed as a cam controller;
said dosage drum is configured to be rotated upon unloading said dry agent for closing of its opening until said at least one recess is brought to the position in which said at least one recess is transverse to a line which passes through a center of an outlet opening of said storage container and a center of an inlet opening of said activator vessel structure;
said dosage drum or said cell wheel have recesses or pockets with a capacity which is less than a predetermined quantity of volume of dry agent for a production cycle; and
a linearly operating dosage apparatus comprising one of: a dosage scale and a linear feeder apparatus;
said linear feeder comprising a cylinder with a reciprocating piston rod and two pistons mounted on the piston rod spaced apart from one another, and wherein said cylinder is connected to said storage container and said two pistons drive into said storage container when it moves backwards and forwards so that dry agent penetrates between said two pistons and is drawn out of said cylinder on the next stroke of said piston;
said linear feeder being arranged vertically beneath said storage container;
said two pistons comprise two sealing discs;
said linear feeder having a lower, considered in the vertical direction, piston; said piston having an outlet slope;
said piston rod, together with said two pistons comprises a plastic injection-molded part;
said linear feeder comprising a lower piston, which is constructed as a membrane seal and/or is mushroom-shaped, or hat-shaped, or cone-shaped;
said pistons comprising plastic pistons with molded sealing lips;
said linear feeder comprising one of:
multiple seals on one piston and/or the use of pistons on the storage container side with the same configuration as the lower piston but mounted displaced by 180 degrees;
a cylinder molded onto said storage container or the use of a storage container with a cylindrical outlet opening matched to said piston rod and said two pistons;
a piston rod connected to one of: a belt drive, a chain drive, and a linear motor drive, a reciprocating cylinder drive, a spindle drive, and a toothed rack and pinion drive;
toothed belts or V-belts in at least said belt drive; a plurality of pistons wherein the piston nearest said storage container is provided with an O-ring and the other piston is provided with a sealing lip;
(d37) said step of operating said circularly-operating dosage apparatus comprising the steps of:
rotating said dosage drum for unloading dry agent into said activator vessel structure until said unloading surface is in an inclined attitude sufficient for unloading said dry agent;
controlling the speed of rotation of said dosage drum for loading and unloading said dry concentrate;
driving said dosage drums or said cell wheels with a stepping motor;
one of:
maintaining said dosage drum in an unloading position upon unloading of dry concentrate into said activator vessel structure until a succeeding dosage cycle; and
moving said dosage drum immediately upon unloading dry concentrate into said activator vessel structure until said at least one recess or pocket is closed with respect to said activator vessel structure; and
returning said dosage drum immediately upon unloading to its filling position when this is of benefit for said dry concentrate;
rotating said dosage drum for filling until said recess for the pertaining filling position provides an inclined inlet surface;
maintaining said inclined inlet surface or the pertaining outlet surface in an inclined and arrested position by stopping rotation of said dosage drum;
controlling the speed of rotation of said dosage drum for loading and unloading said dry agent;
use of the same dosage drums or cell wheels for differing amounts of said dry agent;
varying the dosage movements for adaptation to differing amounts of dry agent;
driving said dosage drums or said cell wheels with a stepping motor;
(e37) said step of operating said linearly-operating dosage apparatus comprising one of the steps of:
bringing said piston rod into a position in which both said two pistons are within a pertaining cylinder portion in order to seal said storage container;
moving said linear feeder apparatus immediately upon unloading to close its filling opening; and
returning said linear feeder apparatus immediately upon unloading to its filling position when this is of benefit for said dry concentrate;
(e37) passing aqueous solvent to said waste water pipes on a daily basis on working days and to the exclusion of holidays;
(f37) using a data processor device comprising a RAM programmed control apparatus for consideration of days of rest;

(g37) metering with said dosage apparatus a predetermined quantity of said dry concentrate to said activator vessel structure; said activator vessel structure being disposed beneath said dosage apparatus; with said metering step of a predetermined quantity of said dry concentrate being carried out in one or several steps to supply said dry concentrate into said activator vessel for said mixing step of mixing said dry concentrate with water or dissolution thereof in water;

(h37) using a circuit control in operation of said dosage apparatus, said circuit control being selected from the group comprising: limit switches for step control, electronic controls, revolution counters, angle of displacement measuring devices, impulse controlled motors, and combinations thereof; and (i37) said step of contacting said waste water pipes and/or grease traps containing grease with said aqueous solvent further comprises one of:
- adjusting said contacting step as a function of data indicative of the content of fatty residues in a stream of waste water or independently of the quantity of flowing-through of waste water;
- passing a determined value of quantity of fatty residue to a data processor device for controlling said contacting step based on a determined value of quantity of fatty residues; and
- controlling said contacting step with said data processor device in conformity with the value of quantity of fatty residues by one of: addition of aqueous solvent based on experience and based on empirically determined data; and
- controlling said contacting step through use of a timer apparatus and/or a control apparatus connected to pertaining device components, said timer apparatus comprises apparatus capable of performing a plurality of cycle intervals for one or several functions of producing said aqueous mixture and said aqueous solvent;

(j37) using a seal on one of: said dosage drum and said linear feeder, said seal comprising one of:
- a rubber seal when using pellets of dry agent and/or a seal made from a thermoplastic material when using powder of dry agent;
- a seal arranged on the outlet side of said dosage drum in a gap between said dosage drum and its surrounding housing;
- a composite seal or a one-piece seal;
- a molded part as a seal and/or of O-rings and straight sealing lips lying between said O-rings;

(k37) using an attached flask or bottle as said storage container and wherein the neck of said flask forms said cylinder;

(l37) using a guide piece and/or inlet piece positioned before said cylinder;

(m37) using one or more water nozzles in said activator vessel structure for pre-coating and/or mixing and/or cleaning, said nozzles being disposed at one of: the base of said activator vessel structure, at the upper rim of said activator vessel structure, in a pertaining lid of said activator vessel structure, in the wall of said activator vessel structure, and in said activator vessel structure;

(n37) said step of mixing water and dry agent comprises one of:
- adding water and dry agent alternately;
- mixing water and dry agent between pertaining feed intervals;
- first feeding dry agent into said activator vessel structure;

(o37) actuating said water nozzles in or at the base of said activator vessel structure;

(p37) feeding water into said activator vessel structure up to a preliminary filling level;

(q37) after the time of activation of said dry agent has expired, effecting a further movement of the aqueous mixture or aqueous solvent in said activator vessel structure by actuating said water nozzles for further movement of the aqueous mixture and for mixing, wherein the quantity of water used for moving the aqueous mixture and for mixing is at the same time used totally or in part for activating said enzymes and said bacteria or in that water is drawn off at the same time from another point;

(r37) actuating said water nozzles for cleaning said activator vessel structure, wherein said nozzles are mounted at an angle and/or tangentially and are directed against the activator vessel structure wall and/or into the pertaining outlet;

(s37) supplying water continuously or intermittently to said nozzles;

(t37) controlling water supply in said activator vessel structure with a level switch and/or a timer switch, wherein said level switch comprises a float switch or a capacitive switch arranged on the outside of said activator vessel structure, and said activator vessel structure comprises:
- an overflow or a plug closure;
- a sieve before the outlet/exit opening of said activator vessel structure when pellets and/or agent granules are used;
- a hollow plug at said outlet of said activator vessel structure, said hollow plug having an open, tubular, upward-protruding end, for acting as an overflow, and to determines the maximum filling level in said activator vessel structure;
- a cone-shaped cover for said overflow in said activator vessel structure;
- an activator vessel structure in which the outlet thereof is not arranged exactly vertically beneath the dry agent feed;
- a revolving or stationary baffle surface for the distribution of dry agent;

(u37) effecting a vertical movement of the bath comprising said aqueous mixture with a pumping mechanism, said pumping mechanism comprising:
- at least one of: horizontally rotating pump rotors, pump impellers, and pump wheels, wherein said pump rotors, pump impellers, and pump wheels are disposed on the base of said activator vessel structure and are matched to the base of said activator vessel structure;
- said pump rotors, pump impellers, pump wheels are disposed such that their height above the base of said activator vessel structure to the height of said activator vessel structure is at least 1:30 and at most 1:3;
- said pump rotors, said pump impellers, said pump wheels have a height from about 10 to about 30 millimeters;
- two of: pump rotors, pump impellers, and pump wheels, disposed one above the other, of which the upper is intended for circulation or mixing and the lower for pumping out;
- one of: a shaft, and an axle, on which are disposed the selected one of: pump rotors, pump impellers, and pump wheels, and wherein each pump rotor, pump impeller, and pump wheel effects a flow in a different direction of rotation and runs freely with the other when rotating in the non-flow direction;

said pump rotors, pump impellers, and pump wheels, having bent vanes, wherein the vanes of one pump rotor, pump impeller, and pump wheel are bent in the opposite circumferential direction to the other pump rotor, pump impeller, and pump wheel;

said vanes having a bending radius that is at least equal to ¼ of the diameter of the pump rotor, pump impeller, and pump wheel and at most equal to ½ of the diameter of the selected pump rotor, pump impeller, and pump wheel;

said pump rotors, pump impellers, and pump wheels are equipped with at least one ring-shaped disc at the top;

said ring-shaped discs leave an opening free in the center and/or form a seal with the edge of the pertaining pump rotor, pump impeller, and pump wheel and/or form channels;

two pump mechanisms are disposed one above the other in said activator vessel structure, of which the lower is intended for emptying and the upper for circulation or mixing;

said activator vessel structure encircles the lower pump mechanism with a ring-shaped channel for collecting the pertaining liquid;

at least one pump whose pertaining central opening and/or the channel at least in the area of the pertaining suction opening is equipped with a filter cover;

said activator vessel structure encircles the two pump mechanisms with a web, which ends at said ring-shaped disc of the lower pump mechanism;

a plurality of pump mechanisms, of which one pump mechanism is equipped with a tube and the other pump mechanism sits on said tube;

air is introduced into said aqueous mixture through said tube;

(v37) deflecting horizontal flow of aqueous mixture into a vertical flow with flow-guiding inserts and/or profiles in said activator vessel structure, wherein said activator vessel structure comprises:

ribs extending vertically on the inside of said activator vessel structure by a distance, or height, that is at least 10% and/or a maximum of 50% of the radius of said activator vessel structure;

said ribs terminate at a distance from the upper rim of said activator vessel structure;

said ribs have a distance of length from the upper rim of said activator vessel structure which is at least equal to ¼ of the diameter of said activator vessel structure;

said ribs have a length which at maximum is equal to ¾ of the diameter of said activator vessel structure and/or which start from the base of said activator structure;

said activator vessel structure has a constant diameter and which is matching the height of said activator vessel structure or the length of said activator vessel structure to a desired activator vessel structure volume and/or activator vessel structure length, which at maximum is equal to ¾ times the activator vessel structure diameter;

said activator vessel structure has a diameter between about 100 and about 300 millimeters;

an air pipe leading into a negative-pressure zone of the pump mechanism for the circulation;

said activator vessel structure is an angled arrangement of said activator vessel structure;

at least one component being made of bacteria-resistant and enzyme-resistant materials;

at least one component made of at least one of: sprayed Teflon, polyethylene (PE), polypropylene (PP), polyoxymethylene (POM), and stainless steel; and and comprising when at least one of: activator vessel structure, device assembly, and supply duct, is arranged before a siphon when viewed in the direction of waste water flow, the siphon is rinsed through at least once when or after said aqueous solvent is run off;

(w37) pumping out said aqueous solvent after the desired growth of said enzymes and said bacteria is reached, wherein that pump is also used for the vertical movement of the bath;

(x37) one of:
maintaining the pump speed at one of:
less than 1500 rpm at least during the pertaining circulation process;
less than 500 rpm; and
between 100 and 300 rpm;
increasing said pump speed when pumping out; and (y37) air provided for activating said enzymes and said bacteria is sucked in by the same pump mechanism as is used for the circulation or mixing and/or is measured in by a separate pump.

* * * * *

UNITED STATES PATENT AND TRADEMARK OFFICE
CERTIFICATE OF CORRECTION

PATENT NO. : 6,706,518 B2
DATED : March 16, 2003
INVENTOR(S) : Hans-Eberhard Lorenz et al.

It is certified that error appears in the above-identified patent and that said Letters Patent is hereby corrected as shown below:

Column 29,
Line 25, before "issued", delete "897" and insert -- 898 --.

Column 30,
Line 31, after 'No.', delete "4,680,157" and insert -- 4,680,158 --.

Column 31,
Line 46, after 'No.', delete " 5,901,557" and insert -- 5,901,558 --.

Column 32,
Line 15, after 'No.', delete "6,038,197" and insert -- 6,038,198 --.
Line 27, after 'No.', delete "6,127,867" and insert -- 6,127,868 --.
Line 57, after 'No.', delete "5,379,427" and insert -- 5,379,428 --.

Column 33,
Line 18, after 'No.', delete "5,881,227" and insert -- 5,881,228 --.

Signed and Sealed this

Tenth Day of August, 2004

JON W. DUDAS
*Acting Director of the United States Patent and Trademark Office*